United States Patent
Sawicki et al.

(10) Patent No.: US 9,880,753 B2
(45) Date of Patent: Jan. 30, 2018

(54) WRITE REQUESTS IN A DISTRIBUTED STORAGE SYSTEM

(75) Inventors: Antoni Sawicki, Mountain View, CA (US); Tomasz Nowak, San Jose, CA (US); Kelly Murphy, Los Altos, CA (US)

(73) Assignee: GRIDSTORE INC., Mountain View, CA (US)

( * ) Notice: Subject to any disclaimer, the term of this patent is extended or adjusted under 35 U.S.C. 154(b) by 367 days.

(21) Appl. No.: 13/492,615

(22) Filed: Jun. 8, 2012

(65) Prior Publication Data

US 2013/0145105 A1 Jun. 6, 2013

Related U.S. Application Data

(63) Continuation-in-part of application No. 12/143,134, filed on Jun. 20, 2008, now abandoned.
(Continued)

(30) Foreign Application Priority Data

Jun. 22, 2007 (IE) .................................. S2007/0453

(51) Int. Cl.
*G06F 3/06* (2006.01)
*H04L 29/08* (2006.01)
*G06F 11/16* (2006.01)

(52) U.S. Cl.
CPC ............ *G06F 3/0619* (2013.01); *G06F 3/067* (2013.01); *G06F 3/0659* (2013.01);
(Continued)

(58) Field of Classification Search
CPC ........ H04L 29/06; H04L 29/08081–29/08099; H04L 29/08117;
(Continued)

(56) References Cited

U.S. PATENT DOCUMENTS

| | | | |
|---|---|---|---|
| 2006/0155946 A1* | 7/2006 | Ji .......................... | G06F 3/0617 711/162 |
| 2007/0067332 A1* | 3/2007 | Gallagher ........... | G06F 21/6227 |
| 2008/0288646 A1* | 11/2008 | Hasha ................. | H04L 67/1095 709/228 |

OTHER PUBLICATIONS

Goel et al. "Data Replication Strategies in Wide Area Distributed Systems," Enterprise Service Computing: From Concept to Deployment (2006). ISBN 1-599044181-2, Idea Group Inc. pp. 211-241. Published: 2006. <http://jarrett.cis.unimelb.edu.au/papers/DataReplicationInDSChapter2006.pdf>.*
(Continued)

*Primary Examiner* — Kevin Bechtel
(74) *Attorney, Agent, or Firm* — Steven R. Sponseller; Stevens Law Group

(57) ABSTRACT

Example data storage systems and methods are described. In one implementation, a method identifies data to be written to a shared storage system that includes multiple storage nodes. The method communicates a write operation vote request to each of the multiple storage nodes. The write operation vote request is associated with a data write operation to write the identified data to the shared storage system. A positive response is received from at least a portion of the multiple storage nodes. The data write operation is initiated in response to receiving positive responses from a quorum of the storage nodes.

9 Claims, 16 Drawing Sheets

Related U.S. Application Data

(60) Provisional application No. 61/520,560, filed on Jun. 10, 2011.

(52) U.S. Cl.
CPC ...... *G06F 11/1662* (2013.01); *H04L 67/1097* (2013.01); *G06F 11/16* (2013.01)

(58) Field of Classification Search
CPC .................. H04L 29/0854–29/08549; H04L 67/1095–67/1097; G06F 3/0619; G06F 3/0659; G06F 3/067; G06F 11/16
USPC .................. 709/204–211, 217–219, 223–229
See application file for complete search history.

(56) References Cited

OTHER PUBLICATIONS

Yu et al. "Analysis of Hybrid Concurrency Control Schemes for a High Data Contention Environment". IEEE Transactions On Software Engineering, Vol. 18, No. 2, Feb. 1992. pp. 118-129.*

Gray et al. "Consensus on Transaction Commit". ACM Transactions on Database Systems, vol. 31, No. 1, Mar. 2006, pp. 133-160.*

Skeen, Dale. "A Quorum-Based Commit Protocol". Department of Computer Science, Cornell University, Ithaca, New York 14853. TR 82-483. <http://ecommons.library.cornell.edu/bitstream/1813/6323/1/82-483.pdf> Published: Feb. 1982.*

\* cited by examiner

WRITE REQUESTS IN A DISTRIBUTED STORAGE SYSTEM

RELATED APPLICATION

This application claims the priority benefit of U.S. Provisional Application Ser. No. 61/520,560, entitled "Data Storage Systems and Methods", filed Jun. 10, 2011, the disclosure of which is incorporated by reference herein in its entirety.

This application also is a continuation-in-part of and claims the benefit of priority to U.S. patent application Ser. No. 12/143,134, filed on Jun. 20, 2008, which claims the benefit of priority under 35 U.S.C. §119 to Ireland Patent Application No. S2007/0453, filed on Jun. 22, 2007, the benefit of priority of each of which is claimed hereby, and each of which is incorporated by reference herein in its entirety.

TECHNICAL FIELD

The present disclosure generally relates to data processing techniques and, more specifically, to systems and methods for storing and retrieving data.

BACKGROUND

FIG. 1 illustrates a traditional data storage model including one or more storage devices, such as hard disks, connected to a single storage controller. The storage controller is responsible for applying data redundancy (e.g., data duplication) and data consistency, as well as orchestrating concurrent data access, to ensure that there are no colliding file or disk operations when storing data to the storage devices. This type of storage controller is either hardware (e.g., a RAID (redundant array of independent disks) controller) or software (e.g., a network file server). As shown in FIG. 1, multiple computing devices access the storage devices through a single storage controller.

The single storage controller model shown in FIG. 1 has potential drawbacks, such as the creation of a bottleneck since all data activities are directed through the single storage controller. As additional computing devices are connected to the storage controller, more bandwidth is generally required. Further, as more storage devices are connected to the storage controller, additional processing power is generally required to calculate the data redundancy and perform other functions. The single storage controller model also represents a single point of failure. Even with multiple redundant storage devices, data loss due to failure of the storage controller is not uncommon. This problem is partially mitigated by a dual or clustered controller. However, since storage controllers are generally complex and expensive, the scalability of such an approach is limited.

BRIEF DESCRIPTION OF THE DRAWINGS

Some embodiments are illustrated by way of example and not limitation in the figures of the accompanying drawings.

DETAILED DESCRIPTION

Figure 1:
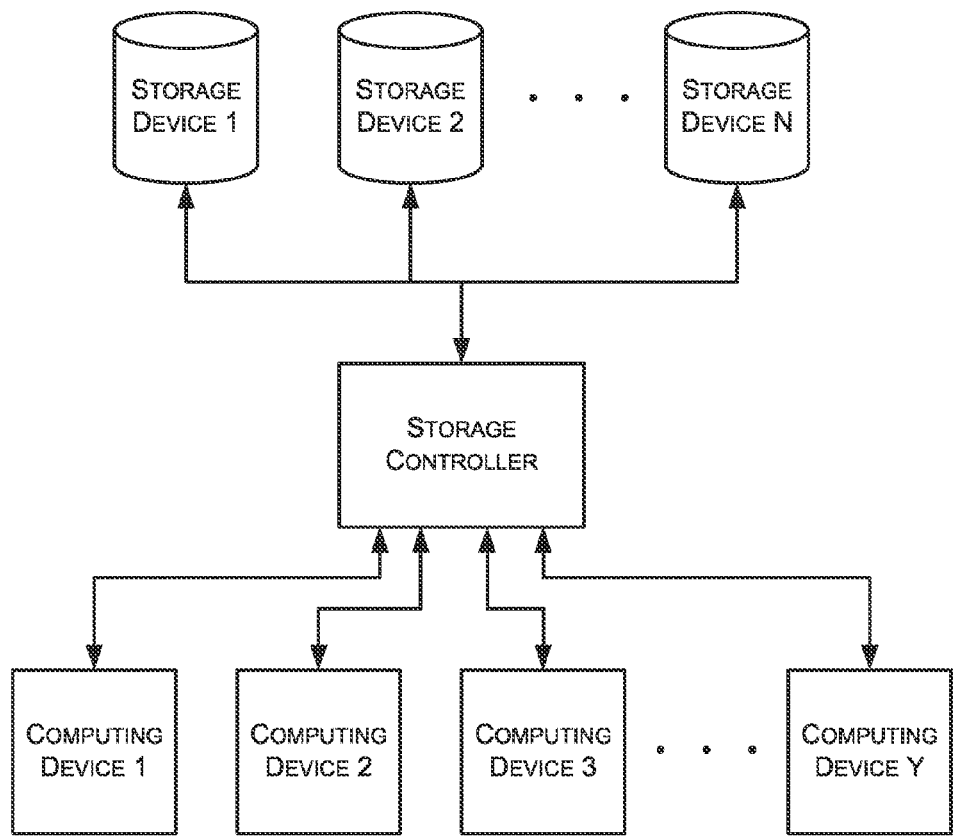
FIG. 1 illustrates a traditional data storage model including multiple storage devices, such as hard disks, connected to a single storage controller.

Example systems and methods to manage the storing and retrieval of data in a shared storage system are described. In the following description, for purposes of explanation, numerous specific details are set forth in order to provide a thorough understanding of example embodiments. It will be evident, however, to those skilled in the art that the present invention may be practiced without these specific details.

The systems and methods described herein utilize a virtual storage controller in each client device to access a shared storage system that includes multiple storage nodes. The virtual storage controller is responsible for applying data redundancy (e.g., data mirroring), applying data consistency, orchestrating concurrent data access, and avoiding any data collisions or other conflicts with file or disk operations. The described systems and methods perform data redundancy calculations and other data-handling operations within the virtual storage controller in each client device, thereby minimizing or eliminating bottlenecks and other restrictions on the performance of a shared storage system.

The systems and methods discussed herein distribute storage processing tasks to any number of virtual storage controllers that operate independently and in parallel with each other. Instead of having a fixed number of storage controllers (e.g., one or two storage controllers), the described systems and methods have as many virtual storage controllers as there are machines or devices that wish to access the shared storage system. Each of the virtual storage controllers may optimize the data for storage before communicating the data across the network to the shared storage system. Additionally, various data fragments are written in parallel to many different storage nodes to increase throughput to the shared storage system. Since the storage nodes do not process the data themselves, they can move data from the network to one or more storage devices (contained within the storage nodes) in an efficient manner.

Since the virtual storage controllers reside and operate within the client device accessing the shared storage system, much of the actual storage I/O (input/output) can be cached locally in the client device. In a typical storage I/O operation, certain parts of the storage node are frequently read from and/or written to. For these elements, the data can be cached locally on the client device to reduce the need to traverse the network and access the various storage nodes in the shared storage system. The offers significant performance increases by reducing the need to traverse the network for data and communicate the data back across the network.

The virtual storage controller can also optimize its behavior based on the data and workload associated with the client device on which the virtual storage controller is running. This optimization can be performed on each client device based on the specific needs and operating patterns of the client device without affecting the operation of other client devices, which have their own virtual storage controllers optimized to the operation of their associated client device. This allows users to maintain one or more client devices or other systems that are capable of performing in an optimized manner for many simultaneous and different workloads.

Figure 2:
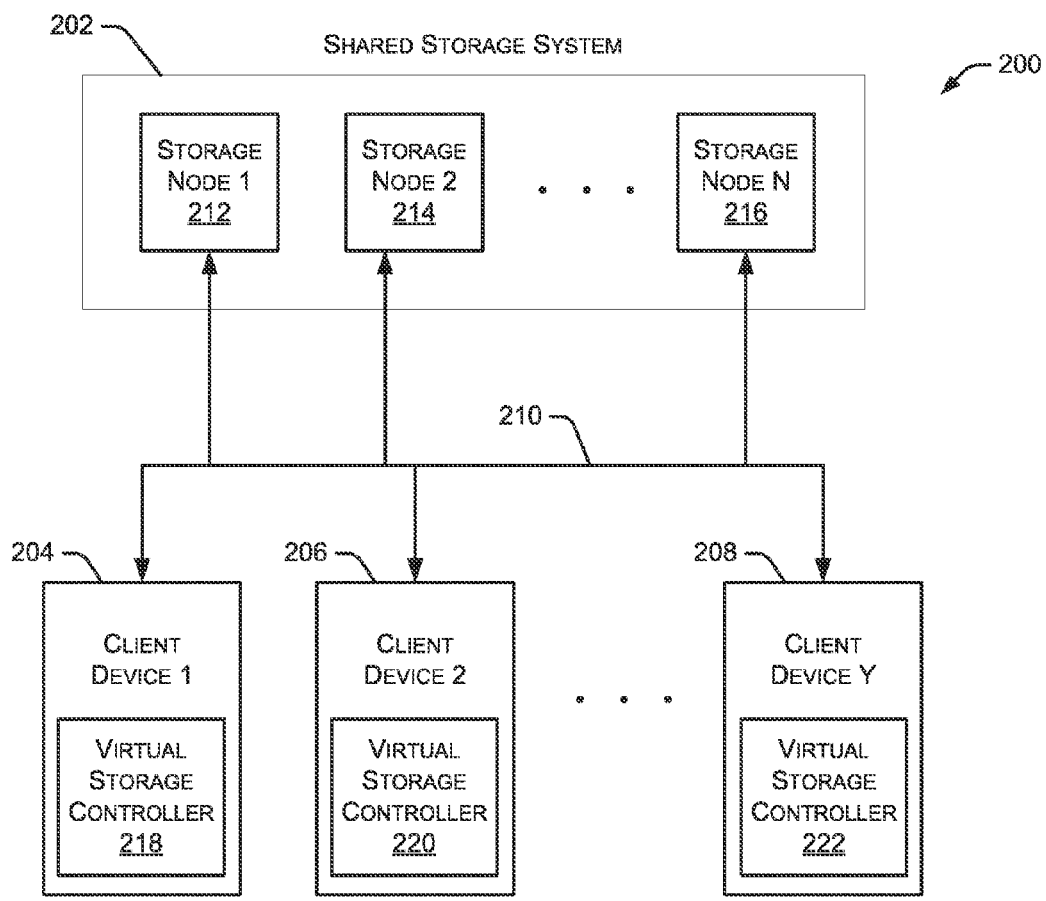
FIG. 2 is a block diagram illustrating an example data storage environment capable of implementing the systems and methods discussed herein.

FIG. 2 is a block diagram illustrating an example data storage environment 200 capable of implementing the systems and methods discussed herein. The data storage environment 200 includes a shared storage system 202 that is accessed by multiple client devices 204, 206, and 208 via a data communication network 210 or other communication mechanism. In some embodiments, the data communication network 210 is a local area network (LAN), wide area network (WAN), the Internet, or a combination of two or more networks.

The shared storage system 202 includes multiple storage nodes 212, 214, and 216, each of which is coupled to the data communication network 210. The storage nodes 212, 214, and 216 are also referred to as "storage devices" or "storage machines". The storage nodes 212, 214, and 216 may be located in a common geographic location or distributed across a variety of different geographic locations and coupled to one another through data communication network 210. Each client device 204, 206, and 208 includes a virtual storage controller 218, 220, and 222, respectively. The client devices 204, 206, and 208 are also referred to as "client machines", "computing devices", or "client nodes". The virtual storage controllers 218-222 are also referred to as "virtual controllers". In some embodiments, data is communicated between client devices 204-208 and storage nodes 212-216 without requesting an acknowledgement receipt from the receiving device. As discussed herein, alternate systems and methods are provided to ensure proper communication of data to a receiving device.

In the data storage environment of FIG. 2, data redundancy calculations and other data-related functions are performed by the virtual storage controllers 218-222 in the client devices 204-208, thereby eliminating the bottleneck caused by the single storage controller model discussed above with respect to FIG. 1. The virtual storage controllers 218-222 also perform operations of orchestrating concurrent access over the data communication network 210 by means of virtual locking, discussed herein.

In some embodiments, each virtual storage controller 218-222 is a software component installed on a client device 204-208 that takes the role of what traditionally would be a hardware or software storage controller residing either on a storage device such as SAN (storage area network), NAS (network attached storage), disk array or a network file server. In other embodiments, the virtual storage controllers 218-222 are implemented as hardware components or hardware modules contained within each client device 204-208.

The virtual storage controllers 218-222 perform various storage logic functions and provide a defined interface though which the client devices 204-208 and various applications running thereon can access the shared storage system 202. Additionally, the virtual storage controllers 218-222 may communicate with the storage nodes 212-216 to perform virtual locking, and to access or store information. During access or store operations, the virtual storage controller 218-222 performs various data redundancy calculations. For example, if one of the storage nodes 212-216 is inactive or missing, the virtual storage controller 218-222 can recalculate the missing data portions using data redundancy information, and present the missing data portions to a client application as though there is no missing storage node.

The client devices 204-208 represent any type of computing device or other system that includes the virtual storage controller 218-222. The client devices 204-208 typically execute a set of applications such as a word processor or server software (e.g., web or email server software). In some embodiments, a backup server stores data backups via the virtual storage controllers 218-222 to the storage nodes 212-216. The client devices 204-208 access the virtual storage controllers 218-222 via defined interfaces. In the case of the Windows Operating System, the client node access may be a mapped network drive, such as G:\folder\file or a UNC (universal naming convention) path, for instance \\datastore\volume\folder\file.

The storage nodes 212-216 may be remote computing devices or other systems capable of accepting different file I/O (input/output) or control requests from the virtual storage controllers 218-222. The storage nodes 212-216 provide storage capacity (e.g., a hard disk) as well as other resources, such as cache memory or CPU processing resources to the virtual storage controllers 218-222. The storage nodes 212-216 can be thought of as a server in the traditional client-server computing model. However, in contrast to such servers the storage nodes 212-216 shown in FIG. 2 have minimal logic and perform file operations as directed by the virtual storage controllers 218-222. Additionally, the storage nodes 212-216 do not generally function as singular units. Instead, there are a minimum number of storage nodes 212-216 required for operation of a particular virtual storage controller 218-222.

Figure 3:
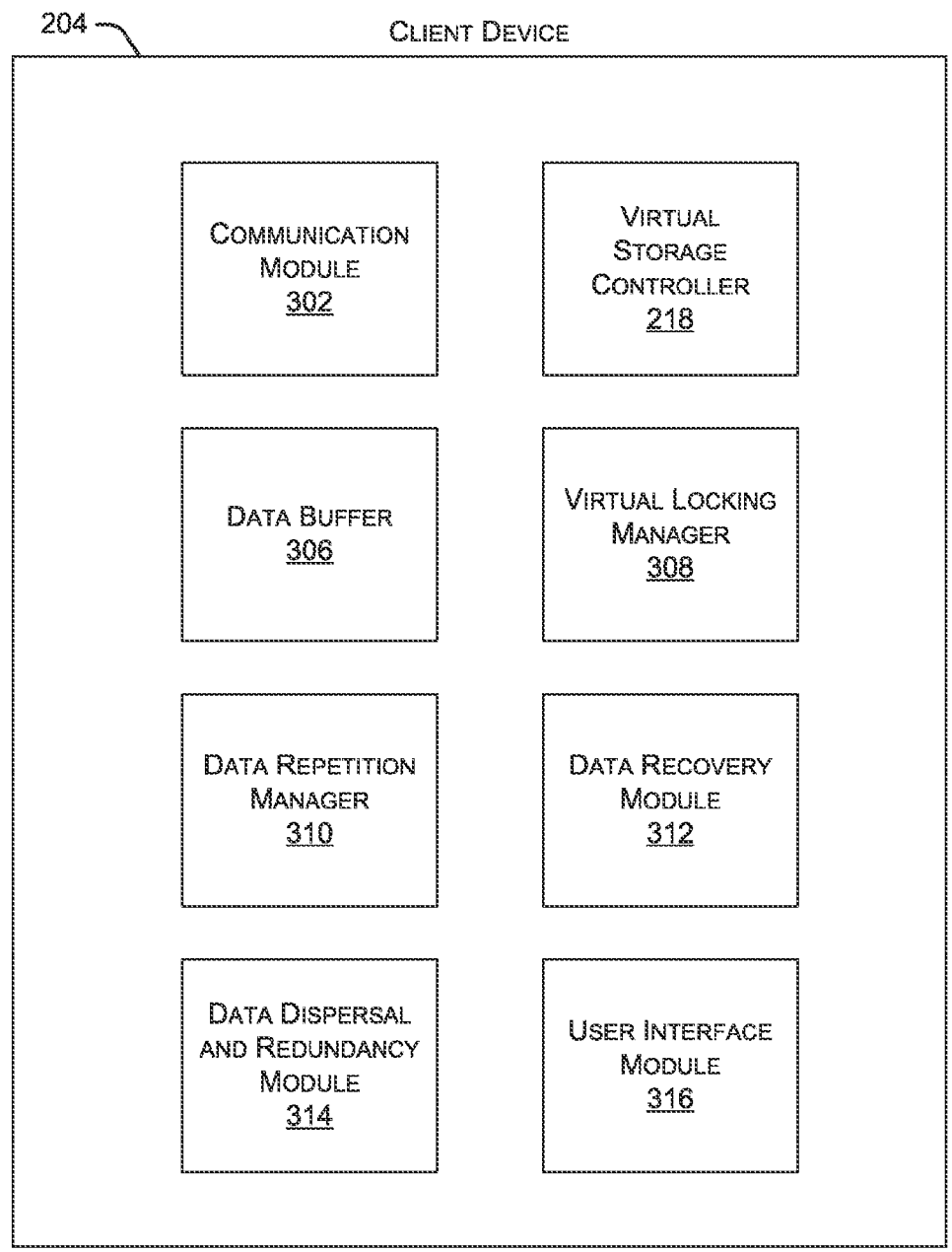
FIG. 3 is a block diagram illustrating an example client device including a virtual storage controller.

FIG. 3 is a block diagram illustrating example client device 204 (shown in FIG. 2) including the virtual storage controller 218. The client device 204 includes a communication module 302 that allows the client device 204 to communicate with other devices and systems, such as storage nodes and other client devices. As discussed herein, the virtual storage controller 218 performs various functions associated with the storage and retrieval of data between the client device 204 and multiple storage nodes in a shared storage system.

The client device 204 also includes a data buffer 306 that stores, for example, incoming and outgoing data. A virtual locking manager 308 performs various virtual locking functions, for example, during the writing of data to the multiple storage nodes. Additional details regarding these virtual locking functions are discussed herein. A data repetition manager 310 handles various data writing and re-writing functions when storing data to the multiple storage nodes. A data recovery module 312 performs various operations related to, for example, restoring or recovering data from one or more storage nodes.

The client device 204 further includes a data dispersal and redundancy module 314 that manages the storing of data on the multiple storage nodes such that the data is dispersed across the multiple storage nodes and stored in a redundant manner. For example, the data dispersal and redundancy module 314 may handle the striping of data across the multiple storage nodes, storing of redundant copies of the same data set, and queuing data for various write operations. A user interface module 316 allows one or more users to interact with the various modules, systems, and applications discussed herein. For example, users may configure various data storage and data retrieval parameters that define the operation of the client device 204 as well as the multiple storage nodes.

Figure 4:
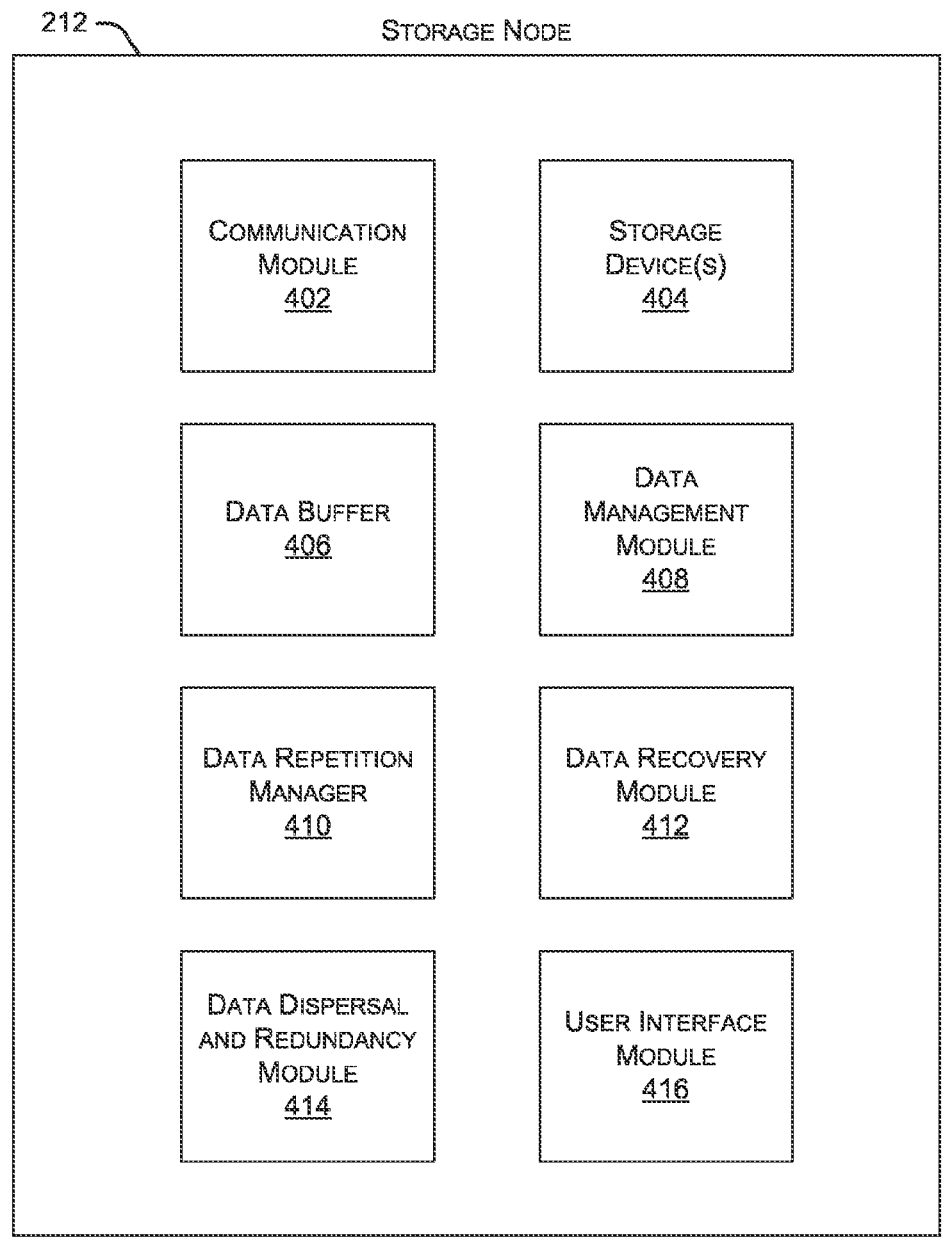
FIG. 4 is a block diagram illustrating an example storage node.

FIG. 4 is a block diagram illustrating example storage node 212 (shown in FIG. 2). The storage node 212 includes a communication module 402 that allows the storage node 212 to communicate with other devices and systems, such as client devices and other storage nodes. The storage node 212 includes one or more storage devices 404, such as hard disk drives, non-volatile memory devices, and the like. The storage node 212 also includes a data buffer 406 that stores, for example, incoming and outgoing data.

The storage node 212 further includes a data management module 408 that handles the storage of data to the storage devices 404 as well as the retrieval of data from the storage devices 404. A data repetition manager 410 handles various data writing and re-writing functions when storing data to the storage devices 404. In some embodiments, the instructions for these data writing and re-writing functions are received from one or more client devices. A data recovery module 412 performs various operations related to, for example, restoring or recovering data from one or more of the storage devices 404.

The storage node 212 also includes a data dispersal and redundancy module 414 that manages the storing of data on the storage devices 404 such that the data is properly dispersed across the storage devices 404 as well as the storage devices in other storage nodes. Further the data dispersal and redundancy module manages the redundant storage of data across the storage devices 404 and the storage devices on other storage nodes. As discussed herein, data may be stored by striping the data across the multiple storage nodes and by storing redundant copies of the same data set across the multiple storage nodes. A user interface module 416 allows one or more users to interact with the various modules, systems, and applications discussed herein. For example, users may configure various data storage and data retrieval parameters that define the operation of the storage node 212 as well as other storage nodes.

Figure 5:
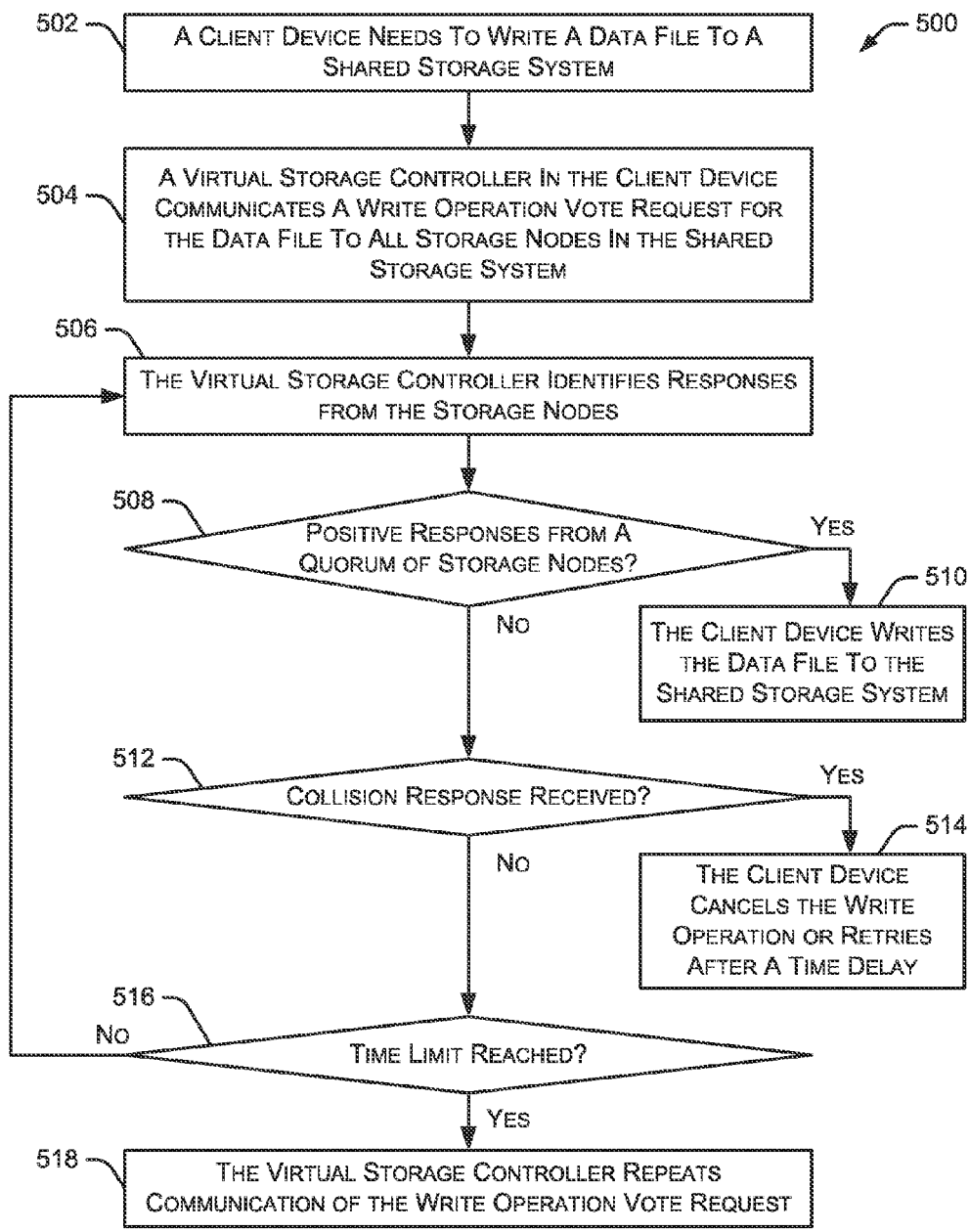
FIG. 5 is a flow diagram illustrating an example method of writing data to a shared storage system.

FIG. 5 is a flow diagram illustrating an example method 500 of writing data to a shared storage system. Initially, a client device needs to write a data file to a shared storage system at 502. Although particular examples discussed herein may refer to a "data file" or a "data packet", the described systems and methods are applicable to any type of data arranged in any manner and having any size. The method 500 continues as a virtual storage controller in the client device communicates a write operation vote request for the data file to all storage nodes in the shared storage system at 504. A write operation vote request is a request for the storage nodes to respond by indicating whether the storage node is available to accept a new write operation. A positive response by the storage node indicates that the storage node is not currently performing another write operation and, therefore, is available to accept a new write operation. A negative response by the storage node indicates that the storage node is not available to accept a new write operation (e.g., the storage node is already processing a different write operation). A negative response is also referred to as a "collision response" because initiation of a new write operation would likely generate a data collision at the storage node.

At 506, the virtual storage controller identifies responses from at least a portion of the storage nodes. In particular implementations, responses to the write operation vote request are received from some storage nodes, but not necessarily all storage nodes in the shared storage system. The method 500 continues by determining whether positive responses (to the write operation vote request) have been received from a quorum of storage nodes at 508. As discussed in greater detail below, a quorum of storage nodes includes more than half of all storage nodes in the shared storage system. For example, if a shared storage system includes 15 storage nodes, a quorum is eight storage nodes. If positive responses are received from a quorum of storage nodes, the client device (e.g., the virtual storage controller in the client device) initiates a write operation to write the data file to the shared storage system at 510. While the client device is performing the write operation, other client devices are prevented from performing other write operations until the pending write operation is completed.

If positive responses are not received from a quorum of storage nodes at 508, the method 500 continues by determining whether at least one collision response was received from a storage node at 512. If at least one collision response was received from a storage node, the client device (e.g., the virtual storage controller in the client device) cancels the intended write operation at 514 or delays the write operation for a period of time and re-sends the write operation vote request after the period of time. If no collision response was received from a storage node at 512, the method 500 continues by determining whether a time limit has been reached at 516. The time period is, for example, a predetermined time period during which responses to the write operation vote request are collected. If the time limit is not reached, the method 500 returns to 506 to continue identifying responses from the storage nodes. However, if the time limit is reached, the virtual storage controller repeats communication of the write operation vote request at 518, thereby repeating method 500.

As mentioned above, a quorum of storage nodes includes more than half of all storage nodes in the shared storage system. A disk or file operation requested by a virtual storage controller in any client device needs a quorum of storage nodes supporting the disk or file operation before the operation can begin. In some embodiments, the number of storage nodes and the corresponding number of quorum nodes is predefined when the client device and the storage nodes are initialized. The number of storage nodes and quorum nodes is updated, as necessary when storage nodes are added or removed from the shared storage system. In a particular implementation, the actual number of storage nodes that make up the quorum is not defined and may differ from time-to-time. For example, if a particular shared storage system includes three storage nodes, a quorum is two storage nodes. For a particular disk or file operation, any two of the three storage nodes will provide a quorum. The two storage nodes in the quorum are the first two storage nodes that provide a positive response to the write operation vote request. Storage nodes that are not part of the quorum are referred to as "redundant nodes" or "out-of-quorum nodes". For example, redundant nodes may have responded after the quorum was established or were disconnected from the network when the write operation vote request was communicated. Any decisions by the quorum of storage nodes, such as allowing a write operation, are also applied to the redundant nodes.

In traditional data storage models, such as the model shown in FIG. 1, a single storage controller coordinates data traffic from individual computing devices to the storage devices, which prevents conflicting file or disk operations. The data storage environment discussed herein (e.g., the environment shown in FIG. 2) does not provide a single storage controller. Although an individual virtual storage controller can make decisions related to the client device on which the virtual storage controller is operating, multiple virtual storage controllers need to coordinate their decisions with respect to the shared storage system. The coordination of multiple virtual storage controllers is accomplished with a virtual locking system.

In some embodiments, the virtual locking system operates as a "democratic" voting among the multiple virtual storage controllers. In particular implementations, the virtual locking system is referred to as a "virtual atomic locking system" because it ensures that conflicting operations do not occur at the same time.

Figure 6:
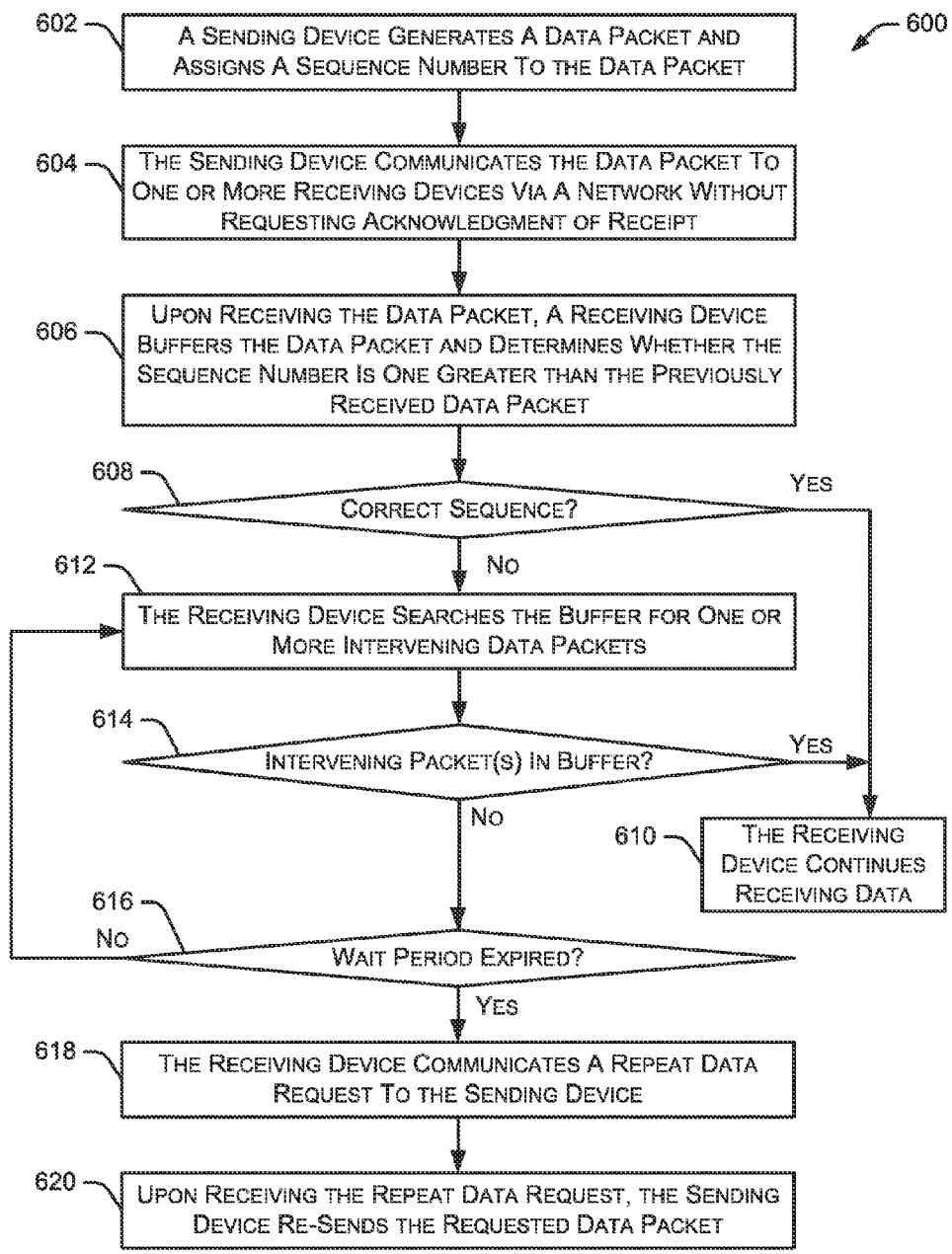
FIG. 6 is a flow diagram illustrating an example method of communicating data between devices across a network.

FIG. 6 is a flow diagram illustrating an example method 600 of communicating data between devices across a network. Initially, a sending device (e.g., a client device) generates a data packet and assigns a sequence number to the data packet at 602. In some embodiments, the sequence number is unique over a particular time period or across a particular number of data packets. The method 600 continues as the sending device communicates the data packet to one or more receiving devices via a network without requesting acknowledgement of a receipt at 604. In this example, data packets are sent between two devices (or nodes) via a data communication network without requiring the generation of a confirmation upon receipt of each data packet. Instead, a buffer, such as a first-in-first-out (FIFO) buffer is used to store previously sent data packets.

Upon receiving the data packet, a receiving device buffers the data packet and determines whether the sequence number is one greater than the previously received data packet at 606. For example, if the previously received data packet has a sequence number of 52918, the next data packet in the sequence will have a sequence number of 52919. If the received data packet has the correct sequence number at 608, the receiving device continues receiving data at 610. However, if the received data packet does not have the correct sequence number, the receiving device searches the buffer (e.g., the FIFO buffer) for one or more intervening data packets at 612. For example, if the previously received data packet has a sequence number of 52918, and the received data packet has a sequence number of 52922, the receiving device searches the buffer for intervening data packets having sequence numbers of 52919, 52920, and 52921.

If the one or more intervening data packets are in the buffer at 614, the receiving device continues receiving data at 610. However, if the intervening data packets are not in the buffer, the method 600 determines whether a waiting period has expired at 616. Since data packets may not arrive in sequential order, the waiting period allows extra time for the "out of order" data packets to arrive such that the receiving device can properly reconstruct the data packets in the correct sequence. In some embodiments, the waiting period is approximately one second. If the waiting period has not expired at 616, the method 600 continues monitoring the buffer for the missing data packets. If the waiting period has expired at 616, the receiving device presumes that the missing data packet has been lost during the communication process, and the receiving device communicates a repeat data request to the sending device at 618. Upon receiving the repeat data request, the sending device re-sends the requested data packet at 620.

Figure 7:
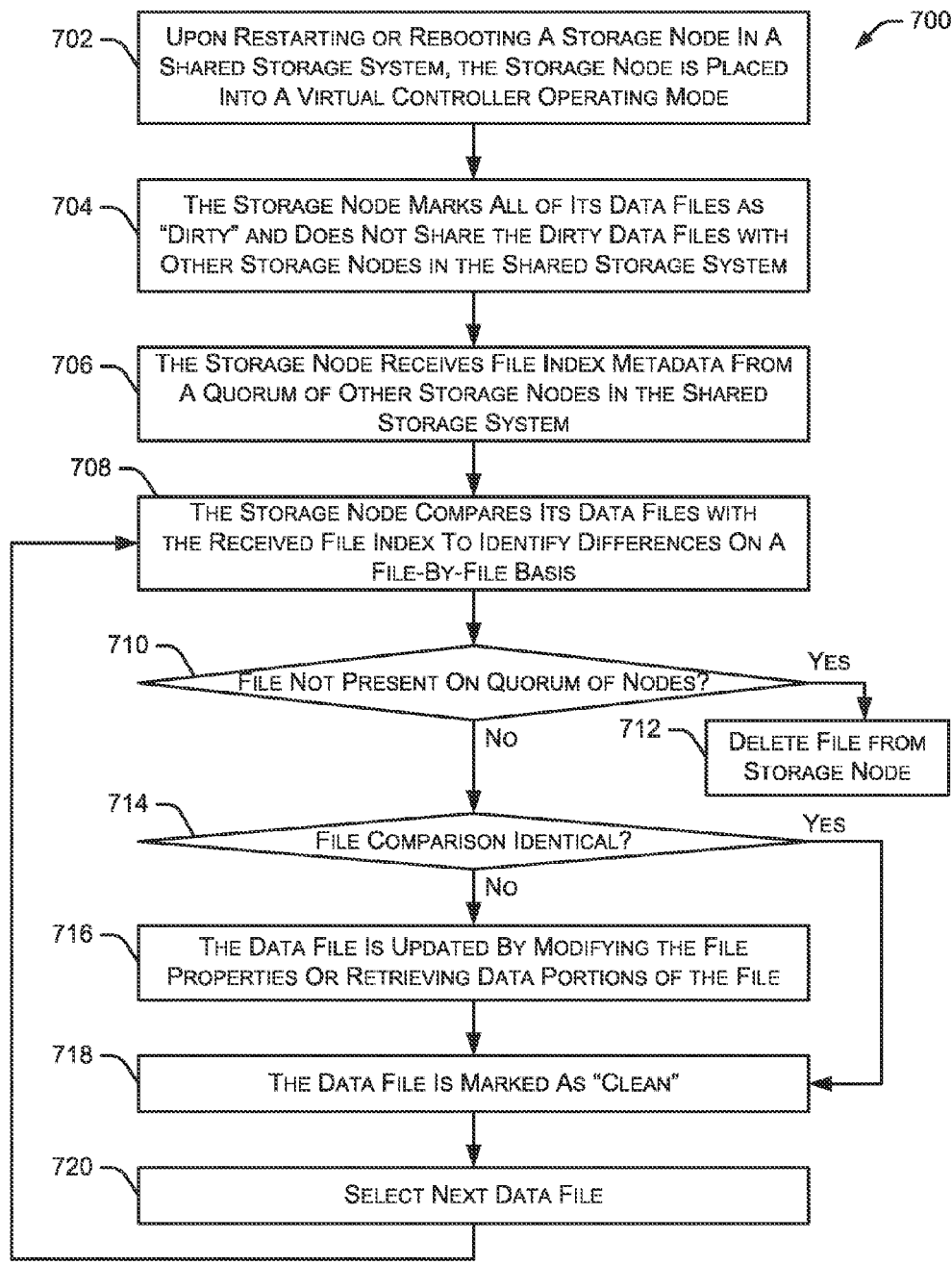
FIG. 7 is a flow diagram illustrating an example method of updating data stored in a storage node upon activation of the storage node.

FIG. 7 is a flow diagram illustrating an example method 700 of updating data stored in a storage node upon activation of the storage node. The method 700 is initiated when a storage node has been powered off or otherwise disconnected from the data communication network for any length of time. In this situation, some of the data in the storage node may be obsolete due to data updates performed while the storage node was disconnected from the data communication network.

Upon restarting or rebooting a storage node in a shared storage system, the storage node is placed into a virtual controller operating mode at 702. In a typical storage node operating mode, the storage node is a "dumb server" that serves requests from client devices (e.g., virtual storage controllers in the client devices). When entering the virtual controller operating mode, the storage node becomes a client device to other storage nodes in the shared storage system, which allows the storage node to receive data from the other storage nodes for purposes of updating the data stored in the storage node.

The storage node marks all of its data files as "dirty" at 704 and does not share the dirty data files with other storage nodes in the shared storage system. Marking a data file as "dirty" indicates that the data file may contain out-of-date information. Data files that contain current (i.e., up-to-date) information are typically marked as "clean" data files.

The method 700 continues as the storage node receives file index metadata from a quorum of other storage nodes in the shared storage system at 706. The file index metadata identifies the current status and content of all data files stored in the shared storage system. The storage node compares the current data files stored within the storage node with the file index metadata at 708 on a file-by-file basis. If a particular data file currently stored on the storage node is not present on a quorum of storage nodes in the shared storage system (as determined at 710), that data file is deleted from the storage node at 712. In this situation, the data file is deleted since a corresponding data file is not present on a quorum of other storage nodes, indicating that the data file was likely deleted from the shared storage system while the storage node was disconnected from the data communication network.

If a particular data file is present on a quorum of nodes (as determined at 710), the method 700 compares the particular data file to the corresponding data file on other storage nodes in the shared storage system at 714. In some embodiments, the data file comparison includes a comparison of a file name, a file size, a date of file creation, a date of last file modification, file attributes, a security attribute, and the like. If the data file on the storage node is identical to the corresponding data file in the shared storage system, the data file is marked as "clean" at 718. If a particular data file is locked or opened for a write operation at the time of the file comparison, the comparison is postponed until the file is unlocked or closed (e.g., the write operation is completed).

If the data file comparison indicates that the data file on the storage node is not identical to the current data file in the shared storage system, as indicated by the file index metadata, the data file is updated by modifying the file properties and/or retrieving data portions of the file at 716. This updating of the data file is performed by accessing one or more of the currently active storage nodes in the quorum of storage nodes. In some embodiments, the data file is read from the quorum of storage nodes on a cluster-by-cluster basis. For each cluster, a fully redundant cluster image is constructed in the storage device's memory and stored to the storage device within the storage node (e.g., storage device 404 shown in FIG. 4). After the data file is updated on the storage node, the data file is marked as "clean" at 718.

The method 700 continues by selecting the next data file for comparison at 720 and returns to 708 where the selected data file is compared with the file index metadata. The method 700 ends after all files in the storage node have been compared with the file index metadata, and updated as necessary. When method 700 ends, the storage node is removed from the virtual controller operating mode and returned to operate as a "normal" storage node in the shared storage system.

Figure 8:
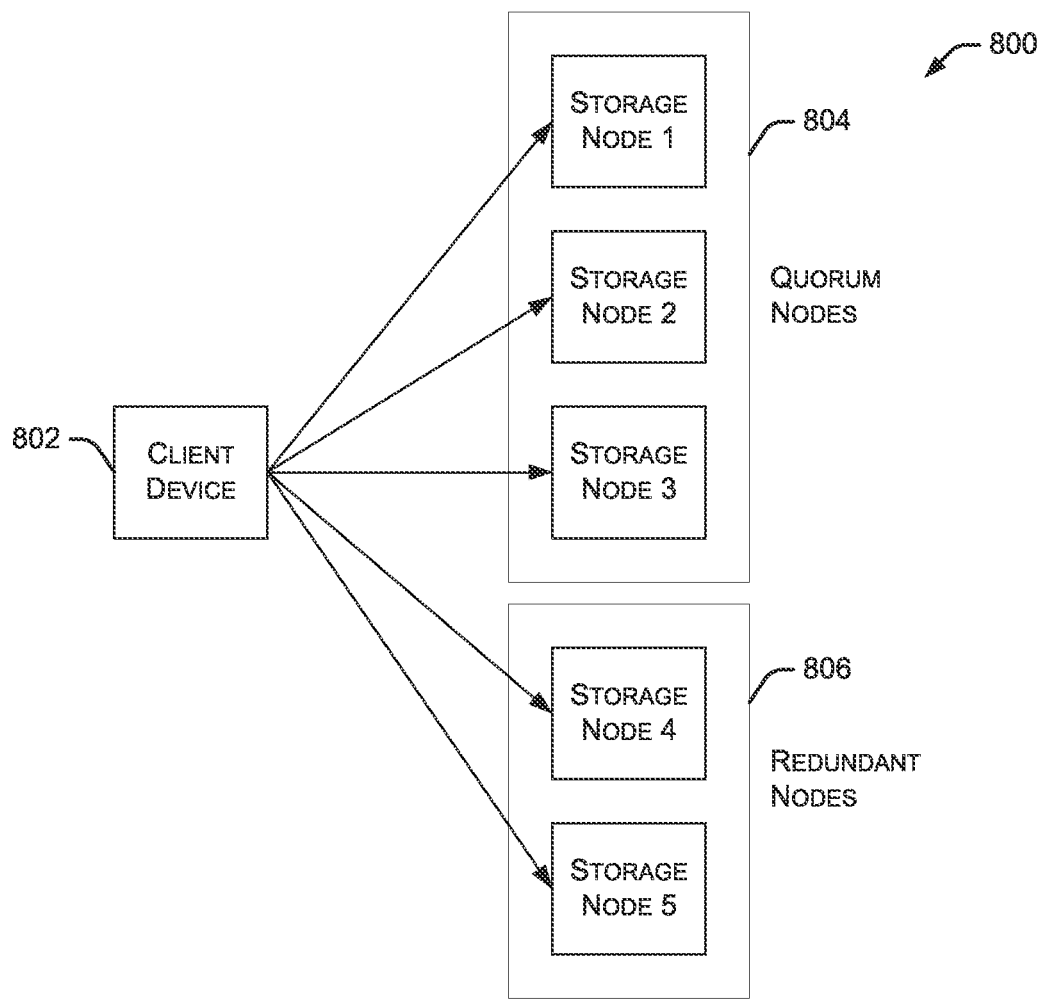
FIG. 8 illustrates example data communications in a data storage environment.

FIG. 8 illustrates example data communications in a data storage environment 800. Five storage nodes are shown in FIG. 8. A quorum of storage nodes is three, which is predefined prior to initialization of the data storage environment 800. In this example, a client device 802 wants to initiate a write operation to the storage nodes in the data storage environment 800. To accomplish this operation, the client device 802 communicates a write operation vote request to each of the five storage nodes, indicated by the five lines from the client device 802 to each of the five storage nodes. In this example, Storage Node 1, Storage Node 2, and Storage Node 3 are the first three storage nodes to positively respond to the write operation vote request. Thus, Storage Node 1, Storage Node 2, and Storage Node 3 become quorum nodes 804 for this particular write operation. Although Storage Node 4 and Storage Node 5 may also respond positively to the write operation vote request, the quorum is already established as Storage Node 1, Storage Node 2, and Storage Node 3. Therefore, Storage Node 4 and Storage Node 5 are redundant nodes 806 for this particular write operation. Although Storage Node 4 and Storage Node 5 are redundant nodes, they still participate in the write operation performed by the client device 802. During future write operations, different groups of storage nodes may be the quorum nodes for those operations.

Figure 9:
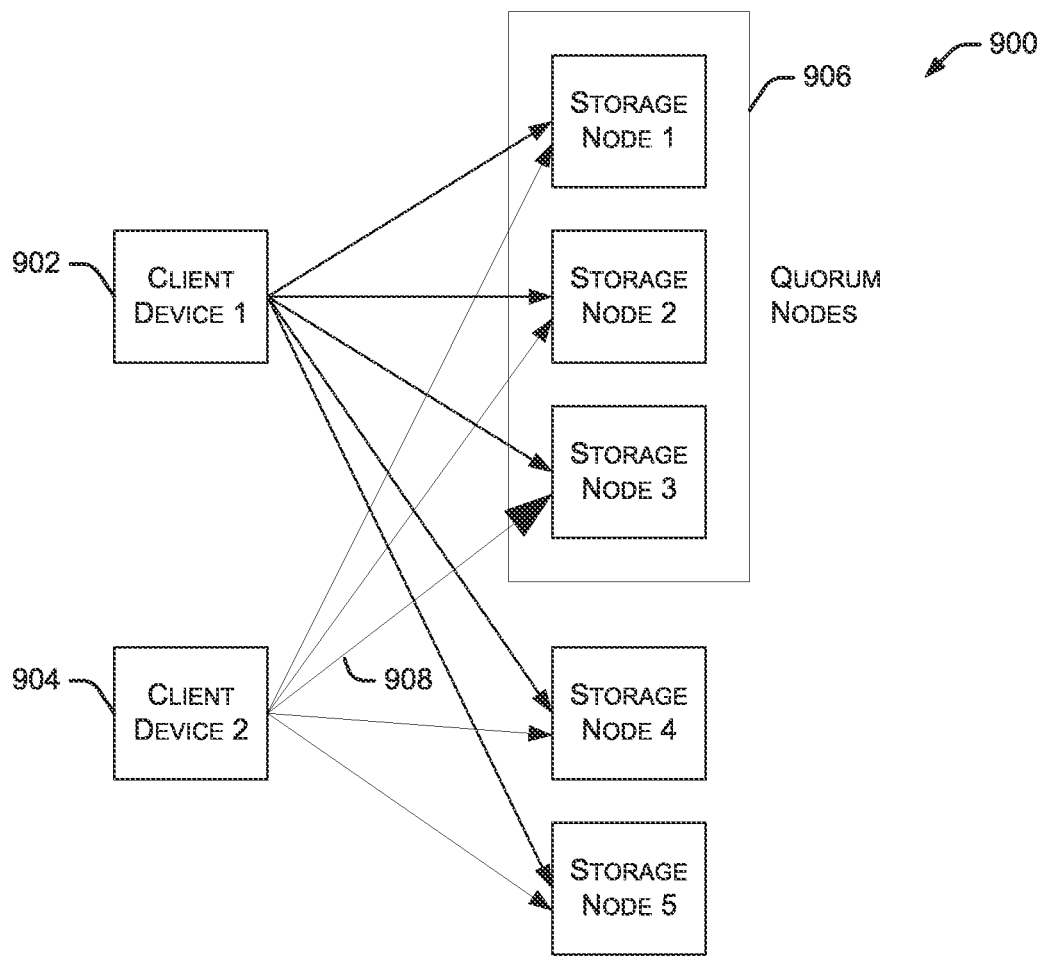
FIG. 9 illustrates another example of data communications in a data storage environment.

FIG. 9 illustrates another example of data communications in a data storage environment 900. Five storage nodes are shown in FIG. 9, and a quorum of storage nodes is three. In this example, a client device 902 wants to initiate a write operation to the storage nodes in the data storage environment 900. Additionally, a client device 904 wants to initiate its own write operation to the storage nodes in the data storage environment 900. Both client devices 902 and 904 communicate a write operation vote request to each of the five storage nodes, indicated by the five solid lines from the client device 902 to each of the five storage nodes, and by the five broken lines from the client device 904 to each of the five storage nodes. The client device 902 establishes a quorum of nodes 906 (Storage Node 1, Storage Node 2, and Storage Node 3) before the client device 904 is able to establish a quorum of nodes. In this example, Storage Node 3 responds to the write operation vote request from the client device 904 (indicated by a bold broken line 908) by sending a collision response. The collision response is generated because Storage Node 3 is already in the quorum 906 and cannot accept another write operation until the write operation initiated by the client device 902 is completed. In response to receiving the collision response, the client device 904 will cancel its intended write operation or wait for a period of time before re-sending another write operation vote request to the multiple storage nodes.

It is important to note that, while both the number of total storage nodes and the number of quorum nodes is predefined at the initialization time, which actual storage nodes of the total nodes that make the quorum for a given operation is matter of a chance. For example, in a minimal configuration, the total storage nodes=3 and quorum nodes=2. Any given operation would require the presence of either storage nodes [1,2] or [1,3] or [2,3]. In some embodiments, quorum membership is established on a FCFS (first come first served) basis. So, if all three storage nodes are present, only the two storage nodes that responded first will be used in the quorum.

Storage nodes that do not make the quorum for a given operation are called out-of-quorum or redundant storage nodes. A redundant storage node can be made such by either being late to FCFS, miss a whole operation, or miss a larger time span. All decisions made by the quorum will be forced upon the redundant storage nodes without question. Therefore, the redundant storage nodes are slightly lagging behind the quorum nodes and have to process extra information. This is overcome by an advanced multilevel queuing mechanism. If a redundant storage node loses a single transaction it will detect the loss and perform a transactional log replay to recover the missing operation. Additionally, if a redundant storage node was absent for a prolonged period of time, it will have to perform full recovery by scanning all files on a disk and downloading missing pieces from other storage nodes, as discussed herein. The term "redundant storage nodes" also applies to the concept of data redundancy. A particular embodiment of the environment of FIG. 2 adds an overhead redundant data to files so that missing chunks can be recovered with some of the storage nodes missing. The number of data nodes is equal to quorum nodes and the number of data redundant nodes is equal to out-of-quorum redundant nodes.

As discussed herein, the environment of FIG. 2 requires the quorum of storage nodes to be more than half of all storage nodes in order to avoid so-called "split brain." If a quorum is defined as a number of nodes less than half, a situation may arise where two separate groups of quorums will think the other part is not present and undertake a decision that may be colliding to the other quorum group. To prevent this, the model defines the quorum to be (½)+1 of the total storage nodes.

As discussed herein, an individual virtual storage controller can make autonomous decisions within the bounds of the computer or client device on which it is running. Multiple distributed virtual storage controllers have to communicate remotely with each other to coordinate decisions. These decisions include, for example, which virtual storage controller can access a particular file on the shared storage system at a given time. The environment of FIG. 2 has solved this problem by developing a virtual atomic locking system, discussed herein, which works by means of "democratic" voting among remote virtual storage controllers. "Atomic" refers to the system's ability to ensure that only one operation can happen at time.

In some embodiments, the storage nodes do not vote themselves. Instead, they are used as a pot where votes from virtual controllers are cast and later are drawn from. In other words, the storage nodes are a scoreboard where virtual storage controllers register pending operations. If there are two offending operations for the same file, a collision (or veto) will occur. Otherwise, the operation will be able continue. To avoid potential abuse of this system, devices will only accept data on which they have a previously open, or registered vote. The virtual locking mechanism exists to ensure atomicity of disk operations and prevent metadata corruption on the lowest level. Concurrent access to files is ensured by individual applications and mechanisms like file, range or opportunistic locking mechanisms.

Figure 10:
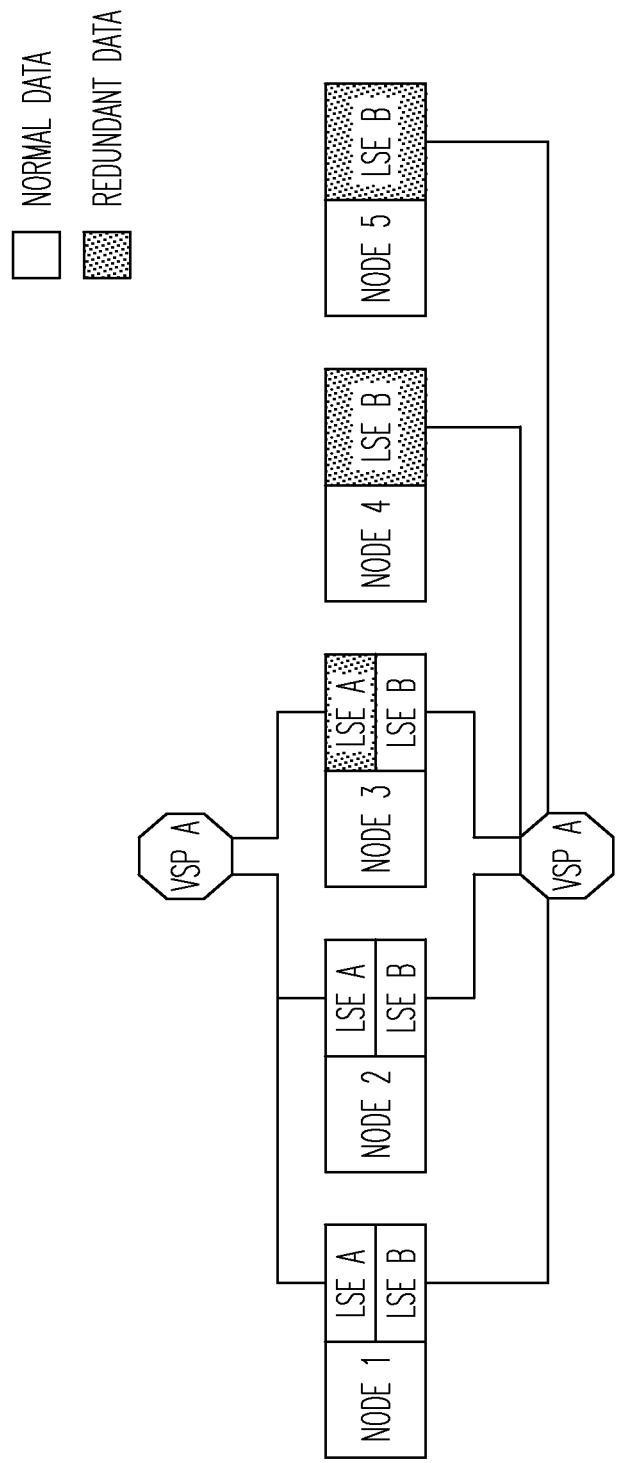
FIG. 10 illustrates an example pair of virtual storage pools (VSP) distributed across a set of nodes.
Figure 11:
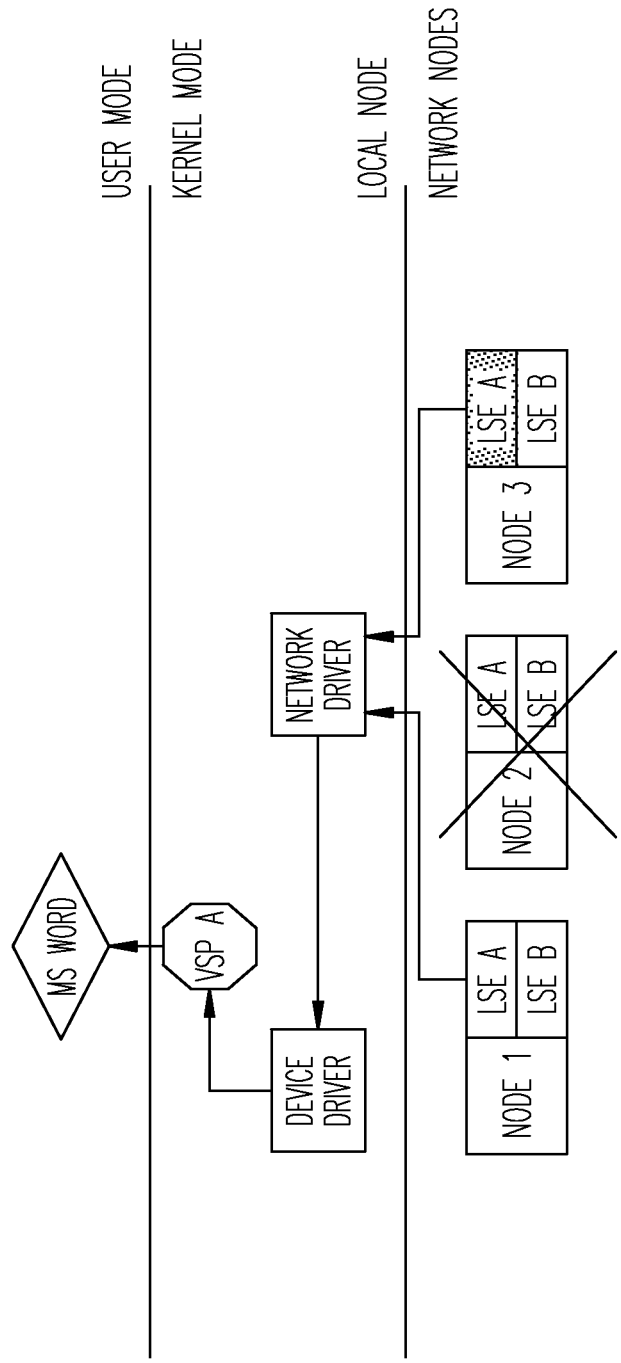
FIG. 11 illustrates an example client application accessing a virtual storage pool.
Figure 12:
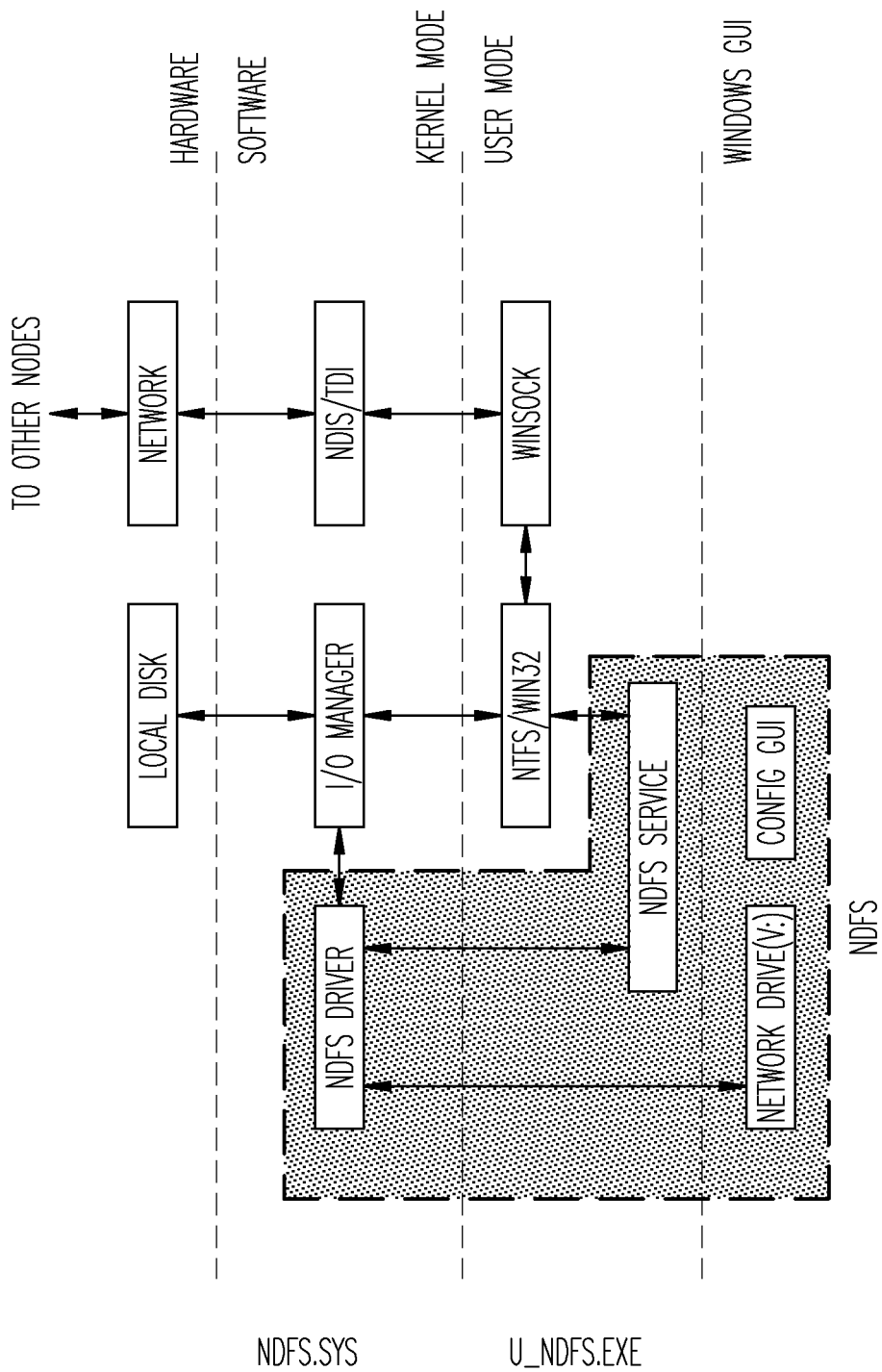
FIG. 12 illustrates example components within a particular client implementation.
Figure 13:
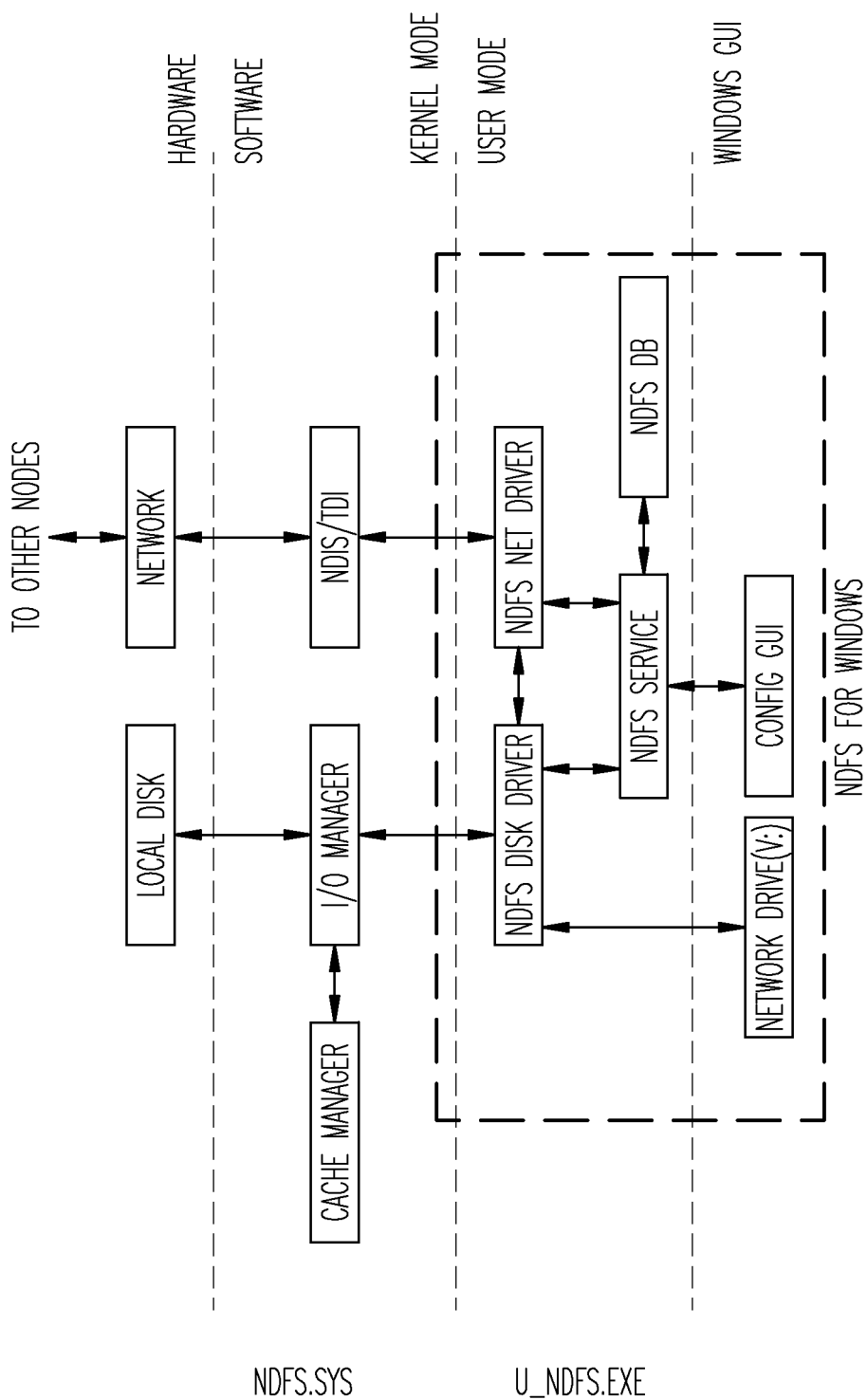
FIG. 13 illustrates example components contained in an alternative client implementation.
Figure 14:
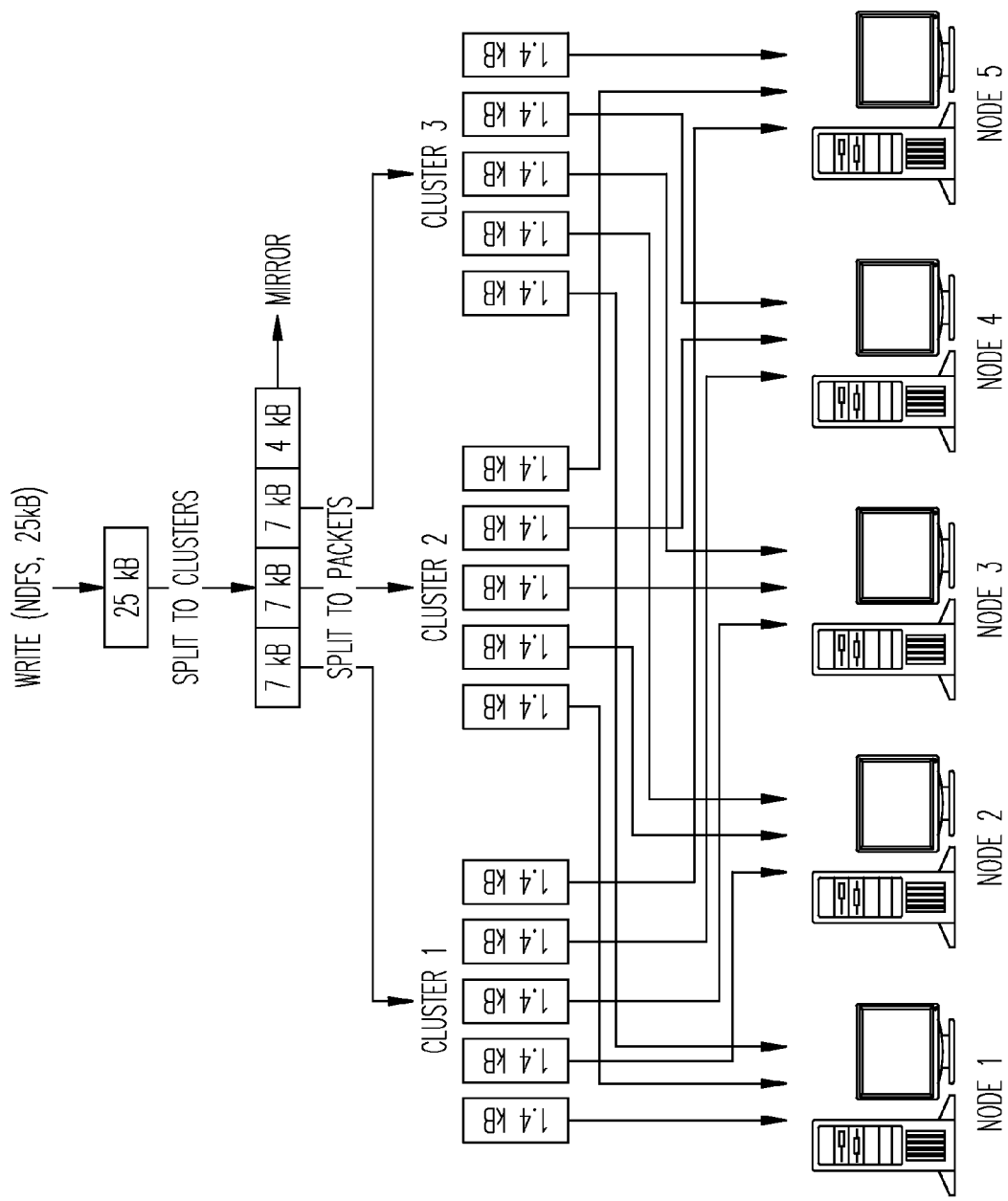
FIG. 14 illustrates the performance of an example write operation.
Figure 15:
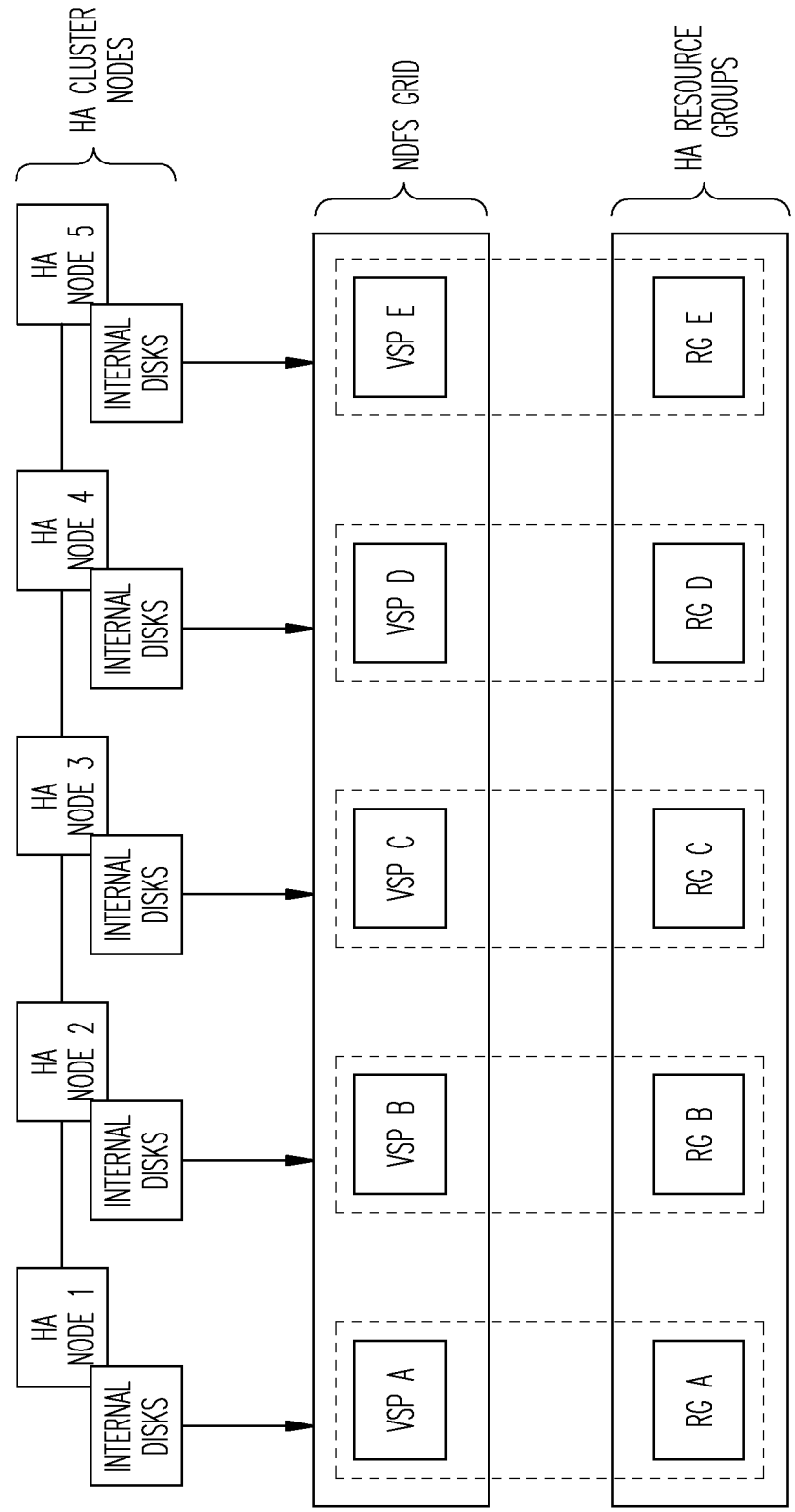
FIG. 15 illustrates an example cluster of virtual storage pools in a high availability group.

FIGS. 10-15 illustrate a particular embodiment of a data storage system and method. FIG. 10 shows schematically a pair of virtual storage pools (VSP) distributed across a set of nodes according to an embodiment of the present invention. FIG. 11 shows a client application accessing a virtual storage pool according to an embodiment of the invention. FIG. 12 shows the main components within a Microsoft Windows client implementation of the invention. FIG. 13 shows the main components within an alternative Microsoft Windows client implementation of the invention. FIG. 14 a write operation being performed according to an embodiment of the invention. FIG. 15 shows a cluster of VSPs in a high availability group.

Referring to FIG. 10, a VSP (Virtual Storage Pool), VSP A or VSP B, according to one embodiment is formed up from Local Storage Entities (LSE) served by either server or client nodes 1 . . . 5. In a simple implementation, an LSE can be just a hidden subdirectory on a disk of the node. However, alternative implementations referred to later could implement an LSE as an embedded transactional database. In general, LSE size is determined by the available free storage space on the various nodes contributing to the VSP. Preferably, LSE size is the same on every node, and so global LSE size within a VSP will be dependent on smallest LSE in the VSP.

The size of VSP is calculated on VSP Geometry:
If no data redundancy is used (Geometry=N), the size of the VSP is determined by the number N of nodes multiplied by size of the LSE.
When mirroring (M replicas) is being used (Geometry=1+M), the size of the VSP is equal to the size of the LSE.
When RAID3/5 is being used (Geometry=N+1), the size of the VSP equals N+1 multiplied by size of LSE.
When RAID-6 is being used (Geometry=N+2), the size of VSP equals N+2 multiplied by size of LSE.
If N+M redundancy is used (Geometry=N+M), the size of VSP equals N+M multiplied by the size of LSE.

Because the LSE is the same on every node, a situation may occur when one or few nodes having a major storage size difference could be under utilized in contributing to virtual network storage. For example in a workgroup of 6 nodes, two nodes having 60 GB disks and four having 120 GB disks, the LSE on two nodes may be only 60 GB, and so single VSP size could only be 6*60 GB=360 GB as opposed to 120+120+120+120+60+60=600 GB.

In such a situation, multiple VSPs can be defined. So in the above example, two VSPs could be created, one 6*60 GB and a second 4*60 GB, and these will be visible as two separate network disks. In fact, multiple VSPs enable different redundancy levels and security characteristics to be applied to different VSPs, so enabling greater flexibility for administrators.

Using the invention, a VSP is visible to an Active Client, Nodes or indeed Legacy Client as a normal disk formed from the combination of LSEs with one of the geometries outlined above. When a client stores or retrieves data from a VSP it attempts to connect to every Server or Node of the VSP and to perform an LSE I/O operation with an offset based on VSP Geometry.

Before describing an implementation of the invention in detail, we define the following terms:
LSE Block Size (LBS) is a minimal size of data that can be accessed on an LSE. Currently it is hard coded at 1024 bytes.
Network Block Size (NBS) is a maximum size of data payload to be transferred in a single packet. Preferably, NBS is smaller than the network MTU (Maximum Transmission Unit)/MSS (Maximum Segment Size) and in the present implementations NBS is equal to LBS, i.e. 1024 bytes, to avoid network fragmentation. (Standard MTU size on an Ethernet type network is 1500 bytes).
VSP Block Size (VBS) is the size of data block at which data is distributed within the network: VBS=LBS*number of non-redundant nodes (N).
VSP Cluster Size (VCS)–data (contents of the files before redundancy is calculated) is divided into so called clusters, similar in to data clusters of traditional disk based file systems (FAT (File Allocation Table), NTFS (New Technology File System)). Cluster size is determined by VSP Geometry and NBS (Network Block Size) in following way:
VCS=Number of Data Nodes*NBS
VCS is a constant data size that a redundancy algorithm can be applied to. If a data unit is smaller than VCS, mirroring is used. If data unit is larger than VCS it will be wrapped to a new cluster. For example, with reference to FIG. 14, if a VSP has 5 data nodes and the NBS is 1400 bytes, the VCS would be 5*1400=7000 bytes. If a client application performs a write I/O operation of 25 kilobytes of data, the NDFS will split it to three clusters (of 7000 bytes) and remaining 4000 bytes will be mirrored among nodes. Another implementation would pad the remaining 4000 bytes with 3000 zeros up to full cluster size and distribute among nodes as a fourth cluster.
Host Block Size (HBS) is the block size used on a host operating system.

Referring now to the implementation of FIG. 12 where only Nodes and a single VSP per network are considered. In this implementation, a simple user mode application (u_ndfs.exe) is used for startup, maintenance, recovery, cleanup, VSP forming, LSE operations and the communication protocol, however, it will be seen that separate functionality could equally be implemented in separate applications.

Upon startup, u_ndfs.exe reads config.xml, a configuration file, which defines LSE location and VSP properties i.e. geometry, disk name and IP addresses of nodes. (The configuration file is defined through user interaction with a configuration GUI portion (CONFIG GUI) of U_ndfs.) U_ndfs then spawns a networking protocol thread, NDFS Service. The network protocol used by the thread binds to a local interface on a UDP port and starts network communications with other nodes contributing to the VSP.

If less than a quorum N of N+M nodes are detected by the node on start-up, the VSP is suspended for that node until a quorum is reached.

Where there is N+M redundancy and where N<=M, it is possible for two separate quorums to exist on two detached networks. In such a case, if N<=50% of N+M, but a quorum is reached at a node, the VSP is set to read-only mode at that node.

Once a quorum is present, local LSE to VSP directory comparison is performed by recovering directory metadata from another node.

If the VSP contains any newer files/directories than the local LSE (for instance if the node has been off the network and files/directories have been changed), a recovery procedure is performed by retrieving redundant network parts from one or more other nodes and rebuilding LSE data for the given file/directory. In a simple implementation, for recovery, the node closest to the requesting node based on network latency is used as the source for metadata recovery.

So for example, in an N+M redundancy VSP implementation, a file is split into N+M clusters, each cluster containing a data component and a redundant component. Where one or more the N+M nodes of the VSP was unavailable when the file was written or updated, during recovery, the previously unavailable node must obtain at least N of the clusters in order to re-build the cluster which should be stored for the file on the recovering node to maintain the overall level of redundancy for all files of the VSP.

It will also be seen that, after start-up and recovery, the networking protocol should remain aware of network failure and needs to perform an LSE rescan and recovery every time the node is reconnected to the network. The user should be alerted to expect access to the VSP when this happens.

A transaction log can be employed to speed up the recovery process instead of using a directory scan, and if the number of changes to the VSP exceeds the log size, a full recovery could be performed.

It can also be useful during recovery to perform full disk scan in a manner of fsck ("file system check" or "file system consistency check" in UNIX) or chkdsk (Windows) to ensure files have not been corrupted.

When LSE data is consistent with the VSP, the networking thread begins server operations and u_ndfs.exe loads a VSP disk device kernel driver (ndfs.sys). The disk device driver (NDFS Driver) then listens to requests from the local operating system and applications, while u_ndfs.exe listens to requests from other nodes through the networking thread.

Referring to FIG. 11, in operation, an application (for instance Microsoft Word) running on the host operating system, calls the I/O subsystem in the OS kernel and requests a portion of data with an offset (0 to file length) and size. (If the size is bigger than HBS, the kernel will fragment the request to smaller subsequent requests). The I/O subsystem then sends an IRP (I/O request packet) message to the responsible device driver module, NDFS driver. In case of a request to the VSP, the kernel device driver receives the request and passes it on to the network protocol thread, NDFS Service, for further processing based on the VSP geometry.

At the same time, when the server side of the networking thread receives a request from a client node through the network, an LSE I/O operation is performed on the local storage.

Both client and server I/Os can be thought of as normal I/O operations with an exception that they are intercepted and passed through the NDFS driver and NDFS service like a proxy. N+M redundancy can thus be implemented with the network protocol transparent to both clients and servers.

Referring now to FIG. 13, in further refined implementation of the invention, a separate kernel driver, NDFS Net Driver, is implemented for high-speed network communications instead of using Winsock. This driver implements its own layer-3 protocol and only reverts to IP/UDP in case of communication problems.

Also, instead of using the Windows file system for the LSE, a database, NDFS DB, can be used. Such a database implemented LSE can also prevent users from manipulating the raw data stored in a hidden directory as in the implementation of FIG. 12.

For the implementation of FIG. 12, a network protocol is used to provide communications between VSP nodes on the network. Preferably, every protocol packet comprises:
Protocol ID
Protocol Version
Geometry
Function ID
Function Data For the implementations of FIGS. 12 and 13, the following functions are defined:

| | |
|---|---|
| NDFS_FN_READ_FILE_REQUEST | 0x0101 |
| NDFS_FN_READ_FILE_REPLY | 0x0201 |
| NDFS_FN_WRITE_FILE | 0x0202 |
| NDFS_FN_CREATE_FILE | 0x0102 |
| NDFS_FN_DELETE_FILE | 0x0103 |
| NDFS_FN_RENAME_FILE | 0x0104 |
| NDFS_FN_SET_FILE_SIZE | 0x0105 |
| NDFS_FN_SET_FILE_ATTR | 0x0106 |
| NDFS_FN_QUERY_DIR_REQUEST | 0x0207 |
| NDFS_FN_QUERY_DIR_REPLY | 0x0203 |
| NDFS_FN_PING_REQUEST | 0x0108 |
| NDFS_FN_PING_REPLY | 0x0204 |
| NDFS_FN_WRITE_MIRRORED | 0x0109 |
| NDFS_FN_READ_MIRRORED_REQUEST | 0x0205 |
| NDFS_FN_READ_MIRRORED_REPLY | 0x0206 |

As can be seen above, every function has a unique id, and the highest order byte defines whether the given function is BROADCAST (1) or UNICAST (2) based.

The functions can be categorized as carrying data or metadata (directory operations). Also defined are control functions such as PING, which do not directly influence the file system or data.

Functions, which carry data are as follows:
READ_REQUEST
READ_REPLY
WRITE
WRITE_MIRRORED
READ_MIRRORED_REQUEST
READ_MIRRORED_REPLY
whereas functions, which carry metadata are as follows:
CREATE—creates a file or directory with a given name and attributes
DELETE—deletes a file or directory with its contents
RENAME—renames a file or directory or its localization in directory structure (MOVE)
SET_ATTR—changes file attributes
SET_SIZE—sets file size. Note that the file size doesn't imply how much space the file physically occupies on the disk and is only an attribute.
QUERY_DIR_REQUEST
QUERY_DIR_REPLY In the present implementations, all metadata (directory information) is available on every participating node. All functions manipulating metadata are therefore BROADCAST based and do not require two way communications—the node modifying data is sent as a broadcast message to all other nodes to update the metadata. Verification of such operations is performed only on the requesting node.

The rest of the metadata functions are used to read directory contents and are used in the recovery process. These functions are unicast based, because the implementations assume metadata to be consistent on all available nodes.

After fragmentation of a file into clusters, the last fragment usually has a random size smaller than the full cluster size (unless the file size is rounded up to the full cluster size).

Such a fragment cannot easily be distributed using N+M redundancy and is stored using 1+M redundancy (replication) using the function WRITE_MIRRORED. This is also valid for files that are smaller than cluster size. (Alternative implementations may have different functionality such as padding or reducing block size to 1 byte.)

WRITE_MIRRORED is a BROADCAST function because an identical data portion is replicated to all nodes. It should be noted that for READ_MIRRORED operations, all data is available locally (because it is identical on every node) and no network I/O is required for such small portions of data (except for recovery purposes).

Note that the mirrored block size has to be smaller than cluster size, however it can be larger than NBS size. In such cases more than one WRITE_MIRRORED packet has to be sent with a different offset for the data being written.

In implementing N+M redundancy, clusters are divided into individual packets. To read data from a file, the broadcast function READ_REQEST is used. The function is sent to all nodes with the cluster offset to be retrieved. Every node replies with unicast function READ_REPLY with its own data for the cluster at NBS size.

The node performing READ_REQUEST waits for first number of data nodes READ_REPLY packets sufficient to recover the data. If enough packets are received, any following reply packets are discarded. The data then is processed by an N+M redundancy function to recover the original file data.

Functions like REQUEST/REPLY have a 64-bit unique identification number generated from the computer's system clock inserted while sending REQUEST. The packet ID is stored to a queue. When the required amount of REPLY packets with same ID is received, the REQUEST ID is removed from the queue. Packets with IDs not matching those in the queue are discarded.

The packet ID is also used in functions other than REQUEST/REPLY to prevent execution of functions on the same node as the sending node. When a node receives a REQUEST packet with an ID matching a REQUEST ID in the REQUEST queue, the REQUEST is removed from the queue. Otherwise the REQUEST function in the packet will be executed.

The broadcast function PING_REQUEST is sent when the networking thread is started on a given node. In response, the node receives a number of unicast responses PING_REPLY from the other nodes, and if these are less than required, the VSP is suspended until quorum is reached.

Every other node starting up sends following PING_REQUEST packets and this can be used to indicate to a node that the required number of nodes are now available, so that VSP operations can be resumed for read-only or read/write.

The PING functions are used to establish the closest (lowest latency) machine to the requesting node and this is used when recovery is performed. As explained above, re-sync and recovery are initiated when a node starts up and connects to the network that has already reached quorum. This is done to synchronize any changes made to files when the node was off the network. When the recovery process is started, every file in every directory is marked with a special attribute. The attribute is removed after recovery is performed. During the recovery operation the disk is not visible to the local user. However, remote nodes can perform I/O operations on the locally stored files not marked with the recovery attribute. This ensures that data cannot be corrupted by desynchronization.

The recovering node reads the directory from the lowest latency node using QUERY_DIR_REQUEST/RESPONSE functions. The directory is compared to locally stored metadata for the VSP. When comparing individual files, the following properties are taken into consideration:

Name—if the file is present on the source machine and not present on the local node, the file will be created using the received metadata and the file recovery process will be performed. If the file exists on the local node and does not exist on the remote node it will be removed locally. Exactly same protocol applies to directories (which are accessed recursively).

Size of file—if the locally stored file size is different to the source node the file, it is removed and recovered.

Last modification time—if the modification time is different the file is deleted and recovered.

File attributes (e.g. read-only, hidden, archive)—unlike the previous parameters, in case of a difference in file attributes, the file is not deleted and recovered, instead only the attributes are applied. In more extensive implementations, attributes such as Access Control List (ACL) and security information can be applied. Also, some implementation may also include several additional attributes such as file versioning or snapshots.

Note that last modification time recovery wouldn't make sense if local time would be used on every machine. Instead every WRITE and WRITE_MIRRORED request carry a requesting node generated timestamp in the packet payload and this timestamp is assigned to the metadata for the file/directory on every node.

Per-file data recovery process is performed by first retrieving the file size from the metadata (which prior to data recovery has to be "metadata recovered"). Then the file size is divided into cluster sizes and standard READ_REQUESTS performed to retrieve the data. An exception is the last cluster which is retrieved from the metadata source node (lowest latency) using READ_MIRRORED_REQUEST. The last part of recovery process comprises setting proper metadata parameters (size, attributes, last modification time) on the file.

File and attribute comparison is performed recursively for all files and folders on the disk storage. When recovery is finished all data is in sync and normal operations are resumed.

Alternative implementations of the invention can have dynamic recovery as opposed to recovery on startup only. For example, the networking thread can detect that the node lost communication with the other nodes and perform recovery each time communication is restored.

As mentioned above, a live transaction log file (journaling) can assist such recovery and the node could periodically check the journal or its serial number to detect if any changes have been made that the node was unaware of. Also the journal checking and metadata and last cluster recovery should be performed in more distributed manner than just trusting the node with lowest latency.

While the above implementations have been described as implemented in Windows platforms, it will be seen that the invention can equally be implemented with other operating systems, as despite operating system differences a similar architecture to that shown in FIGS. 12 and 13 can be used.

In more extensive implementations of the invention, different security models can be applied to a VSP:

Open Access—no additional security mechanisms, anyone with a compatible client can access the VSP. Only collision detection will have to be performed to avoid data corruption. Standard Windows ACLs and Active Directory authentication will apply.

Symmetric Key Access—a node trying to access VSP will have to provide a shared pass-phrase. The data on LSE and/or protocol messages will be encrypted and the pass-phrase will be used to decrypt data on fly when doing N+M redundancy calculations.

Certificate Security—in this security model, when forming a VSP, every node will have to exchange its public keys with every other node on the network. When a new node tries to access the VSP it will have to be authorized on every existing participating node (very high security).

While the implementations above have been described in terms of active clients, servers and nodes, it will be seen that the invention can easily be made available to legacy clients, for example, using Windows Share. It may be particularly desirable to allow access only to clients which are more likely to be highly available, for example, a laptop.

Further variations of the above described implementations are also possible. So for example, rather than using an IP or MAC to identify nodes participating in a VSP, a dedicated NODE_ID could be used. Administration functions could also be expanded to enable one node to be replaced with another node in the VSP, individual nodes to be added or removed from the VSP or the VSP geometry to be changed.

Additionally the VSP could be implemented in a way that represents a continuous random access device formatted with a native file system such as FAT, NTFS or EXT/UFS on Unix. The VSP could also be used as virtual magnetic tape device for storing backups using traditional backup software.

Native Filesystem usage represents a potential problem where multiple nodes, while updating the same volume, could corrupt the VSP file system meta data due to multi node locking. To mitigate this, either a clustered filesystem would be used, or each node could access only a separate virtualized partition at a time.

Figure 16:
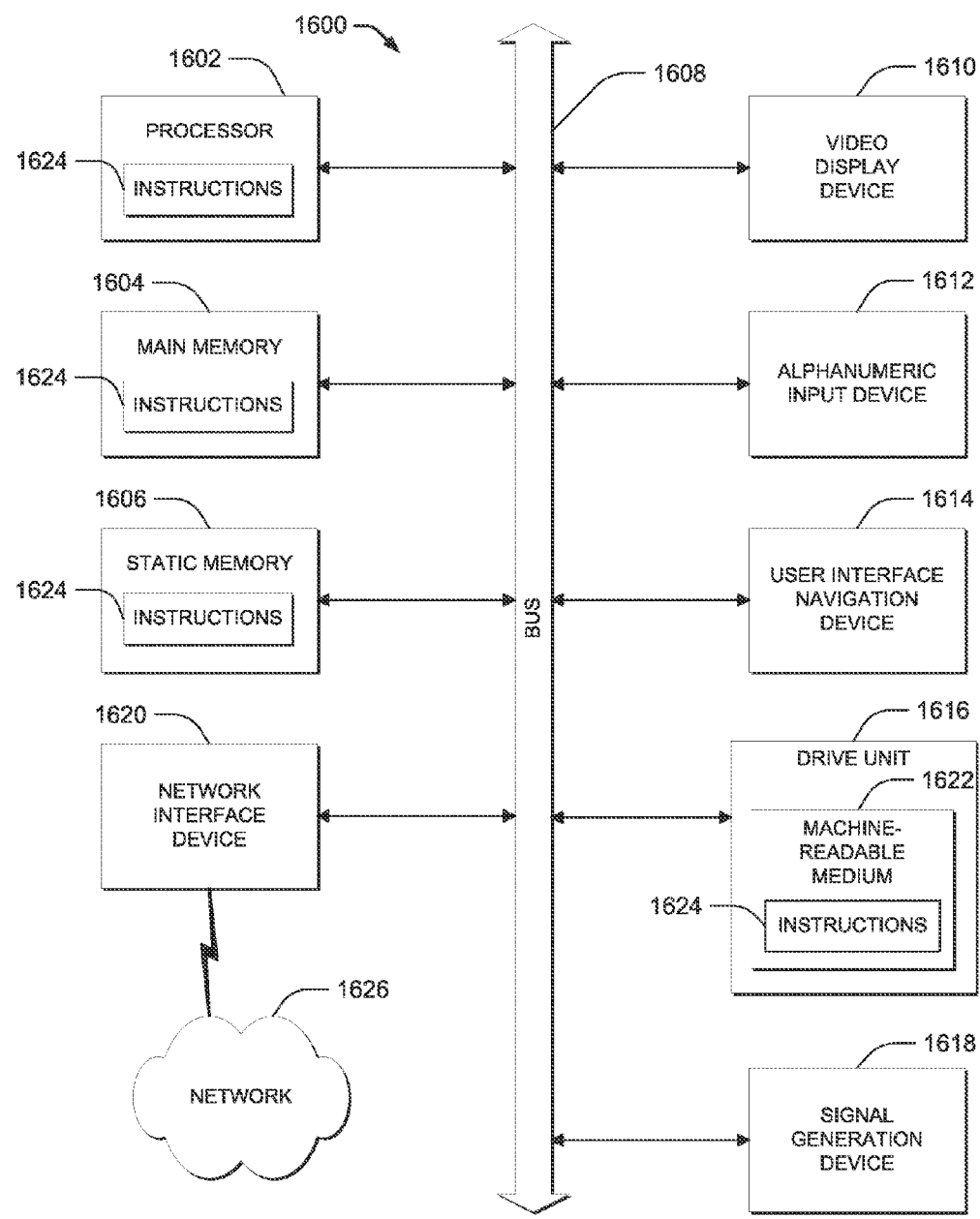
FIG. 16 is a block diagram of a machine in the example form of a computer system within which a set of instructions, for causing the machine to perform any one or more of the methodologies discussed herein, may be executed.

For example, in a High Availability cluster such as Microsoft Cluster Server, Sun Cluster or HP Serviceguard, a HA Resource Group traditionally comprises a LUN or Disk Volume or partition residing on a shared storage (disk array or SAN) that is used only by this Resource Group and moves between nodes together with other resources. Referring now to FIG. 15, such a LUN or partition could be replaced with NDFS VSP formed out of cluster nodes and internal disks, so removing HA cluster software dependency on shared physical storage FIG. 16 is a block diagram of a machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1600 includes a processor 1602 (e.g., a central processing unit (CPU), a graphics processing unit (GPU) or both), a main memory 1604, and a static memory 1606, which communicate with each other via a bus 1608. Computer system 1600 may further include a video display device 1610 (e.g., a liquid crystal display (LCD) or a cathode ray tube (CRT)). Computer system 1600 also includes an alphanumeric input device 1612 (e.g., a keyboard), a user interface (UI) navigation device 1614 (e.g., a mouse), a disk drive unit 1616, a signal generation device 1618 (e.g., a speaker) and a network interface device 1620.

Disk drive unit 1616 includes a machine-readable medium 1622 on which is stored one or more sets of instructions and data structures (e.g., software) 1624 embodying or utilized by any one or more of the methodologies or functions described herein. Instructions 1624 may also reside, completely or at least partially, within main memory 1604, within static memory 1606, and/or within processor 1602 during execution thereof by computer system 1600, main memory 1604 and processor 1602 also constituting machine-readable media.

While machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 1624 may further be transmitted or received over a communications network 1626 using a transmission medium. Instructions 1624 may be transmitted using network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. For example, the described systems and methods may provide an educational benefit in other disciplines that by providing incentives for users to access the systems and methods. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   sharing, by a plurality of client machines, a shared storage system comprising a plurality of storage nodes;
   running an instance of a storage-controller software on each client machine of the plurality of client machines;
   identifying, by a first instance of the storage-controller software running on a first client machine of the plurality of client machines, data to be written to the shared storage system;
   communicating, by the first instance of the storage-controller software, a write operation vote request to each of the plurality of storage nodes, the write operation vote request corresponding to a data write operation to write the data to the shared storage system;
   receiving, by the first instance of the storage-controller software, positive responses to the write operation vote request from more than half the plurality of storage nodes, wherein each response of the positive responses indicates that the associated storage node is available to accept a new write operation; and
   initiating, by the first instance of the storage-controller software, the data write operation responsive to receiving the positive responses from half of the plurality of storage nodes plus 1 if the number of the plurality of storage nodes is even or half of the plurality of storage nodes plus ½ if the number of the plurality of storage nodes is odd, wherein the data write operation stripes the data across all of the plurality of storage nodes such that all the data is stored by the plurality of storage nodes and no node of the plurality of storage nodes stores all the data.

2. A method as recited in claim 1, further comprising preventing other data write operations to any of the plurality of storage nodes until the data write operation is complete.

3. A method as recited in claim 1, wherein the write operation concurrently writes strips of the data to the plurality of storage nodes.

4. A method as recited in claim 1, wherein the data write operation redundantly stores the data on the plurality of storage nodes.

5. A method as recited in claim 1, wherein the communicating of the write operation vote request to each of the plurality of storage nodes is performed without requesting an acknowledgement receipt from the plurality of storage nodes.

6. A system comprising:
   a plurality of client machines;
   a shared storage system that is shared by the plurality of client machines and comprises a plurality of storage nodes; and
   a plurality of instances of a storage-controller software, each instance thereof running on a different client machine of the plurality of client machines, wherein the storage-controller software is programmed to:
   identify data to be written to the shared storage system;
   communicate a write operation vote request to each of the plurality of storage nodes, the write operation vote request associated with a data write operation to write the data to the shared storage system;
   receive positive responses to the write operation vote request from at least a portion of the plurality of storage nodes, wherein each response of the positive responses indicates that the associated storage node is available to accept a new write operation; and
   initiate the data write operation responsive to receiving positive responses from a quorum of the storage nodes, wherein the quorum of the storage nodes is half of the plurality of storage nodes plus 1 if the number of the plurality of storage nodes is even or half of the plurality of storage nodes plus ½ if the number of the plurality of storage nodes is odd, wherein the data write operation stripes the data across all of the plurality of storage nodes such that all the data is stored by the plurality of storage nodes and no node of the plurality of storage nodes stores all the data.

7. The system as recited in claim 6, wherein the storage-controller software is further programmed to prevent additional data write operations to any of the plurality of storage nodes until the data write operation is complete.

8. The system as recited in claim 6, wherein the storage-controller software is further programmed to repeat communication of the write operation vote request responsive to failing to receive a positive response from a quorum of the storage nodes within a predetermined time period.

9. The system as recited in claim 6, wherein the data write operation concurrently writes strips of the data to the plurality of storage nodes.

* * * * *